United States Patent
Hotta et al.

(10) Patent No.: US 10,868,331 B2
(45) Date of Patent: Dec. 15, 2020

(54) SECONDARY BATTERY, BATTERY PACK, VEHICLE, AND STATIONARY POWER SUPPLY

(71) Applicant: KABUSHIKI KAISHA TOSHIBA, Minato-ku (JP)

(72) Inventors: Yasuyuki Hotta, Tokyo (JP); Shinsuke Matsuno, Tokyo (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/119,782

(22) Filed: Aug. 31, 2018

(65) Prior Publication Data
US 2019/0288332 A1    Sep. 19, 2019

(30) Foreign Application Priority Data
Mar. 16, 2018 (JP) .................................. 2018-049978

(51) Int. Cl.
*H01M 4/02* (2006.01)
*H01M 10/0565* (2010.01)
(Continued)

(52) U.S. Cl.
CPC ......... *H01M 10/0565* (2013.01); *B60L 58/10* (2019.02); *H01M 2/1673* (2013.01);
(Continued)

(58) Field of Classification Search
CPC ...................................................... H01M 4/02
See application file for complete search history.

(56) References Cited

U.S. PATENT DOCUMENTS

| 6,403,253 B1 | 6/2002 | Wainwright et al. |
| 2012/0251891 A1 | 10/2012 | Li et al. |

(Continued)

FOREIGN PATENT DOCUMENTS

| JP | 9-508490 | 8/1997 |
| JP | 10-269844 | 10/1998 |

(Continued)

OTHER PUBLICATIONS

Liu, S., et al. "Rechargeable Aqueous Lithium-Ion Battery of TiO2/LiMn2O4 with a High Voltage", Journal of the Electrochemical Society, 158(12) A1490-A1497, 2011, 8 pages.

*Primary Examiner* — Jacob B Marks
(74) *Attorney, Agent, or Firm* — Oblon, McClelland, Maier & Neustadt, L.L.P.

(57) ABSTRACT

According to one embodiment, a secondary battery is provided. The separator includes a porous self-supporting film, a solid electrolyte layer, and a first binder. The solid electrolyte layer is provided on one main surface of the porous self-supporting film. The porous self-supported film and the solid electrolyte layer are adhered with the first binder. The first binder exists on both of the one main surface and another main surface of the porous self-supporting film. The solid electrolyte layer includes solid electrolyte particles and a second binder. The solid electrolyte particles have alkali metal ions conductivity. The polymeric material of the second bonder is a same as the polymeric material of the first material.

20 Claims, 8 Drawing Sheets

(51) Int. Cl.
  *B60L 58/10*      (2019.01)
  *H01M 2/16*       (2006.01)
  *H01M 10/0525*    (2010.01)
  *H01M 10/0585*    (2010.01)
  *H01M 10/42*      (2006.01)

(52) U.S. Cl.
  CPC ..... *H01M 2/1686* (2013.01); *H01M 10/0525* (2013.01); *H01M 10/0585* (2013.01); *H01M 10/425* (2013.01); *H01M 2010/4271* (2013.01); *H01M 2300/0082* (2013.01)

(56) References Cited

U.S. PATENT DOCUMENTS

| | | |
|---|---|---|
| 2013/0244102 A1 | 9/2013 | Golodnitsky et al. |
| 2014/0234726 A1 | 8/2014 | Christensen et al. |
| 2015/0111110 A1 | 4/2015 | Watanabe et al. |
| 2017/0271682 A1 | 9/2017 | Matsuno et al. |
| 2017/0271717 A1 | 9/2017 | Yamashita et al. |
| 2018/0083303 A1* | 3/2018 | Platt ................ C08G 75/14 |
| 2018/0083321 A1 | 3/2018 | Hotta et al. |
| 2018/0277813 A1 | 9/2018 | Yoshima et al. |
| 2018/0277899 A1 | 9/2018 | Takami et al. |
| 2019/0089012 A1 | 3/2019 | Hotta et al. |

FOREIGN PATENT DOCUMENTS

| | | |
|---|---|---|
| JP | 2000-77073 | 3/2000 |
| JP | 2003-17057 | 1/2003 |
| JP | 2005-71807 | 3/2005 |
| JP | 2012-221565 A | 11/2012 |
| JP | 2013-232284 | 11/2013 |
| JP | 2014-500597 | 1/2014 |
| JP | 2014-096311 A | 5/2014 |
| JP | 2015-32535 | 2/2015 |
| JP | 2016-512649 | 4/2016 |
| JP | 2016-173956 | 9/2016 |
| JP | 2017-174809 | 9/2017 |
| JP | 2017-174810 | 9/2017 |
| JP | 2018-45966 | 3/2018 |
| JP | 6321287 | 5/2018 |
| JP | 2018-160342 A | 10/2018 |
| JP | 2018-160443 A | 10/2018 |
| JP | 2019-57360 A | 4/2019 |
| WO | WO 2012/063827 A1 | 5/2012 |

* cited by examiner

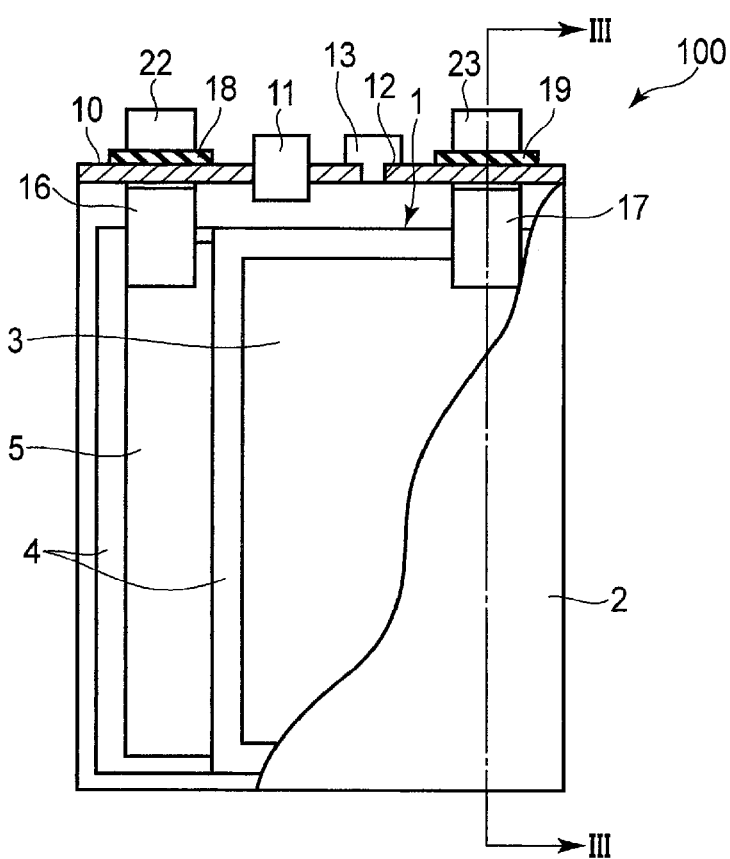
F I G. 3

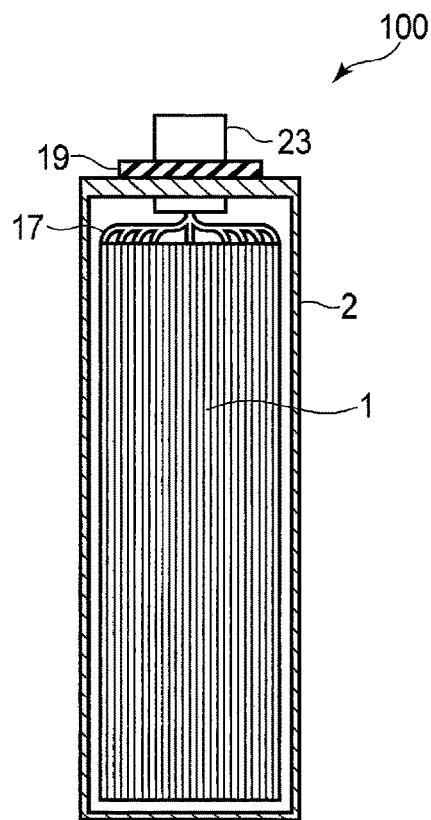
F I G. 4
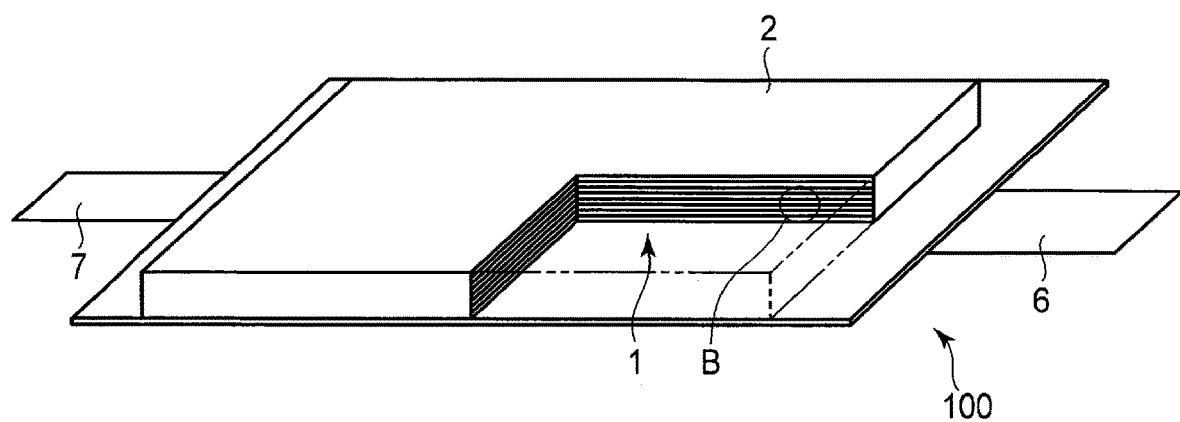
F I G. 5

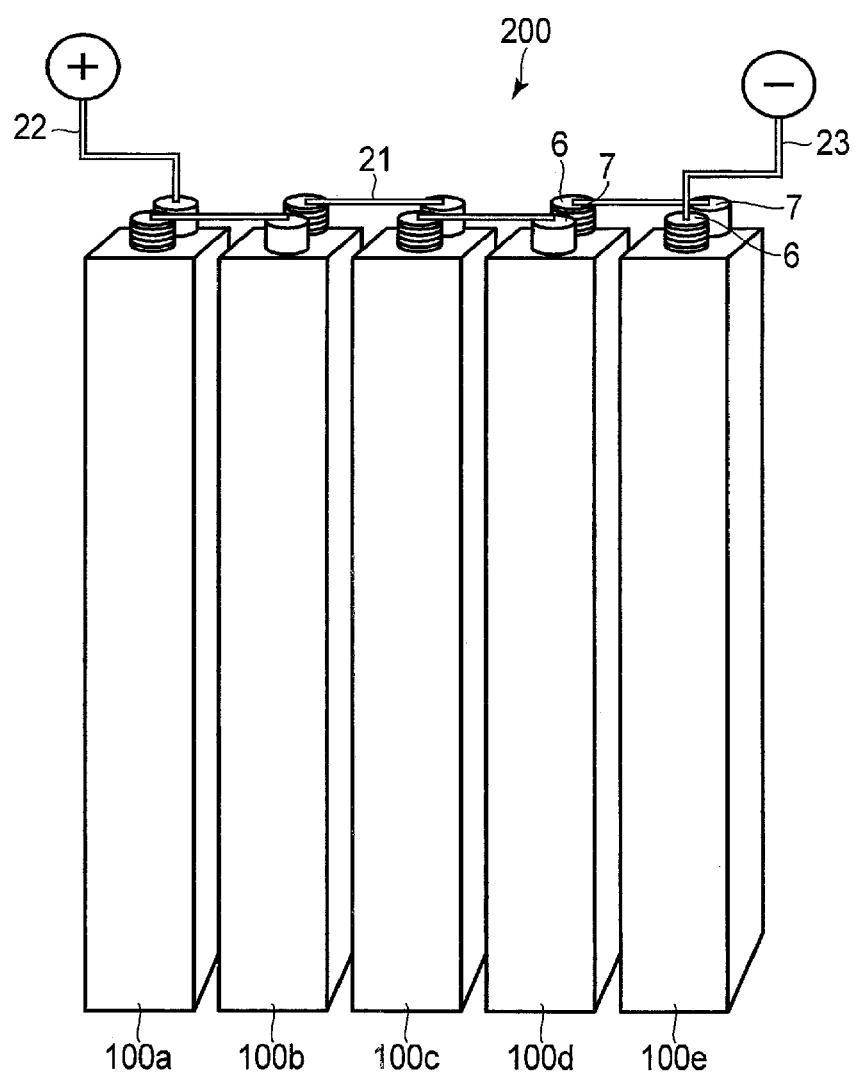
F I G. 7

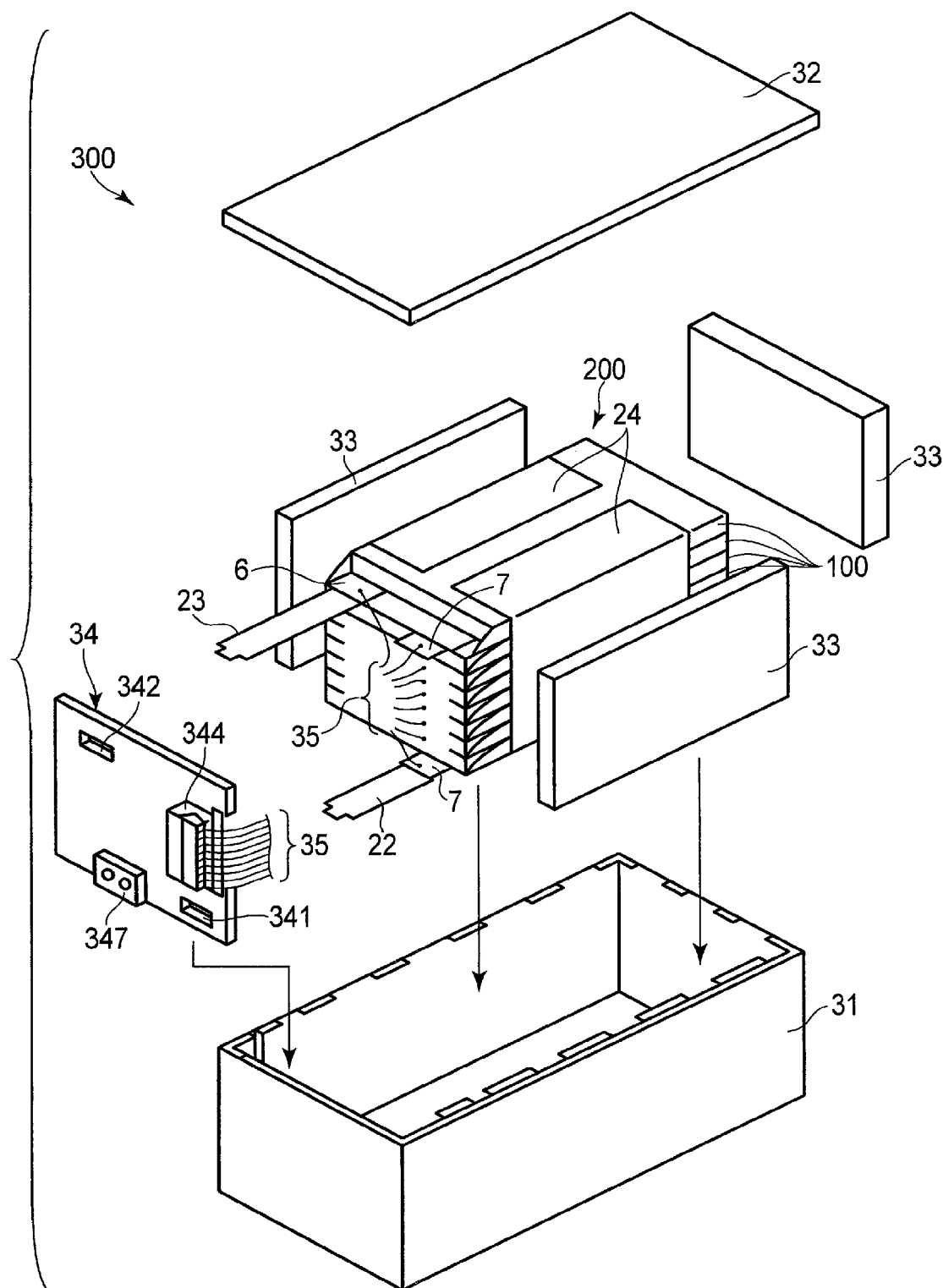
F I G. 8

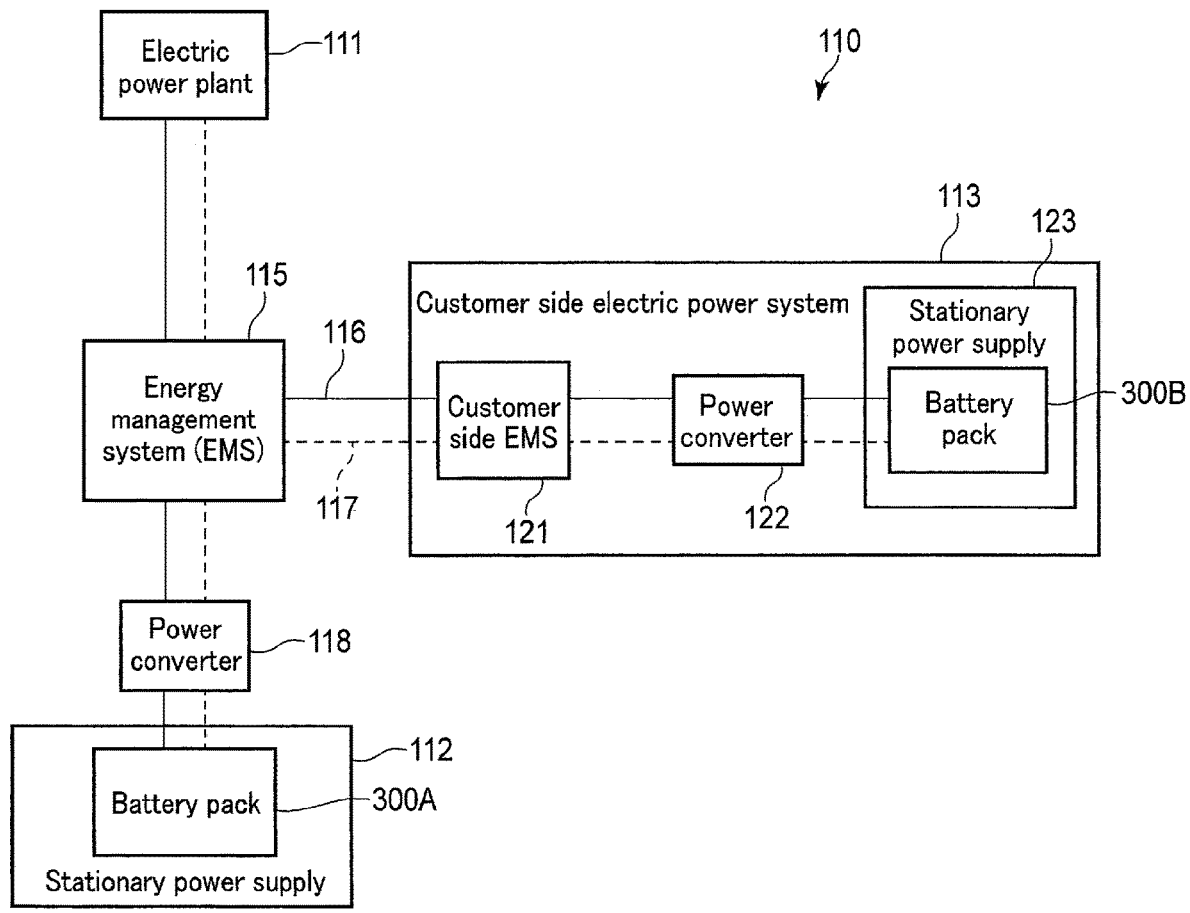
F I G. 11

SECONDARY BATTERY, BATTERY PACK, VEHICLE, AND STATIONARY POWER SUPPLY

CROSS-REFERENCE TO RELATED APPLICATIONS

This application is based upon and claims the benefit of priority from Japanese Patent Application No. 2018-049978, filed Mar. 16, 2018, the entire contents of which are incorporated herein by reference.

FIELD

Embodiments described herein relate generally to a secondary battery, a battery pack, a vehicle and a stationary power supply.

BACKGROUND

A nonaqueous electrolyte battery such as a lithium ion secondary battery is used as a power supply in a broad field. The forms of nonaqueous electrolyte batteries include many different forms from small batteries for various kinds of electronic devices and the like to large batteries for electric vehicles and the like.

A nonaqueous electrolyte battery includes a negative electrode containing a negative electrode active material, a positive electrode containing a positive electrode active material, a separator, and a nonaqueous electrolyte. As the negative electrode active material, for example, a carbon material or a lithium titanium oxide is used. As the positive electrode active material, for example, a layered oxide containing nickel, cobalt, manganese, and the like is used. As the separator, for example, a porous film made of a resin or a nonwoven fabric is used.

As the nonaqueous electrolyte, a liquid nonaqueous electrolyte obtained by dissolving an electrolyte salt in a nonaqueous solvent can be used. As the nonaqueous solvent, for example, a mixture of ethylene carbonate and methyl ethyl carbonate or the like is used. The nonaqueous electrolyte has high oxidation resistance and high reduction resistance, and electrolysis of the solvent hardly occurs. For this reason, the nonaqueous electrolyte battery can implement a high electromotive force and excellent charge-and-discharge performance. However, since many nonaqueous solvents are combustible materials, the nonaqueous electrolyte battery needs various measures to improve safety.

Here, as the electrolyte, an aqueous electrolyte obtained by dissolving an electrolyte salt in an aqueous solvent is known. Examples of a battery using the aqueous electrolyte are a nickel/hydrogen battery and a lead storage battery. In general, the aqueous solvent does not have combustibility. Hence, when the aqueous electrolyte is used, a battery having high safety can be obtained as compared to a case in which a nonaqueous electrolyte is used.

However, water contained in the aqueous solvent has a narrow potential window, as compared to a nonaqueous solvent. The potential window is related to electrolysis of the solvent. For this reason, in the aqueous electrolyte battery, the potential range in which charge and discharge are executed needs to be limited to a potential range in which electrolysis of water does not occur. Hence, the aqueous electrolyte battery cannot easily obtain a sufficient energy density, and the charge-and-discharge efficiency is low, as compared to the nonaqueous electrolyte battery.

BRIEF DESCRIPTION OF THE DRAWINGS

FIG. 3 is a sectional view schematically showing another example of the secondary battery according to the first embodiment;

FIG. 4 is a sectional view of the secondary battery shown in FIG. 3 taken along a line III-III;

FIG. 5 is a partially cut-out perspective view schematically showing another example of a secondary battery according to the first embodiment;

FIG. 7 is a perspective view schematically showing an example of the battery module according to the second embodiment;

FIG. 8 is an exploded perspective view schematically showing an example of the battery pack according to the third embodiment;

DETAILED DESCRIPTION

Figure 1:
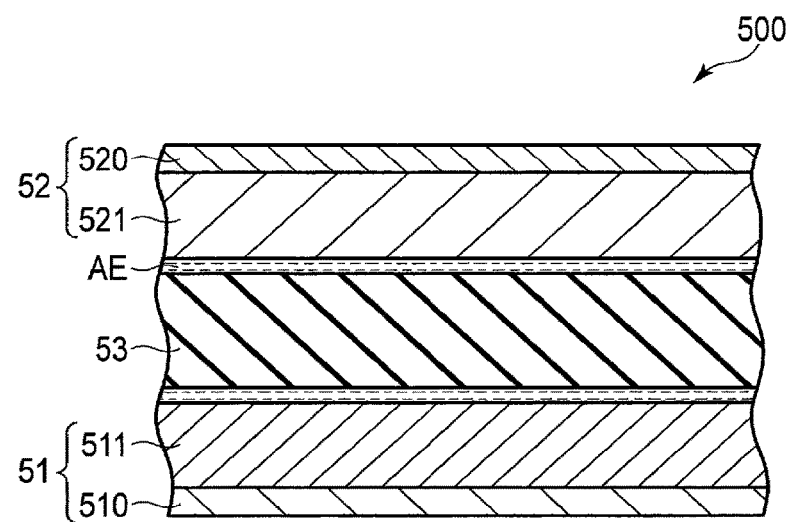
FIG. 1 is a sectional view schematically showing an example of the secondary battery according to the first embodiment.

According to one embodiment, a secondary battery is provided. The secondary battery includes a positive electrode, a negative electrode, a separator, and an aqueous electrolyte. The positive electrode includes a positive electrode active material. The negative electrode includes a negative electrode active material. The separator is located at least between the positive electrode and the negative electrode. The separator includes a porous self-supporting film, a solid electrolyte layer, and a first binder. The solid electrolyte layer is provided on one main surface of the porous self-supporting film. The first binder contains a polymeric material. The porous self-supported film and the solid electrolyte layer are adhered with the first binder. The first binder exists on both of the one main surface and another main surface of the porous self-supporting film. The solid electrolyte layer includes solid electrolyte particles and a second binder. The solid electrolyte particles have alkali metal ions conductivity. The second binder contains a polymeric material. The polymeric material of the second binder is a same as the polymeric material of the first material.

According to another embodiment, a battery pack is provided. The battery pack includes the secondary battery according to the embodiment.

According to another embodiment, a vehicle is provided. The vehicle includes the battery pack according to the embodiment.

According to another embodiment, a stationary power supply is provided. The stationary power supply includes the battery pack according to the embodiment.

An embodiment of the present invention will now be described with reference to the accompanying drawings. Portions denoted by the same reference numerals are portions corresponding to each other. Note that the drawings are schematic or conceptual views, and the relationship between the thickness and the width of each portion, the size ratio between portions, and the like do not necessarily match the actuality. In addition, the same portions are sometimes shown in different sizes or ratios depending on the drawing.

First Embodiment

A secondary battery according to the first embodiment includes a positive electrode, a negative electrode, separator, and an aqueous electrolyte.

The positive electrode includes a positive electrode active material. The negative electrode includes a negative electrode active material. The separator is located at least between the positive electrode and the negative electrode. The separator includes a porous self-supporting film, a solid electrolyte layer, and a first binder. The solid electrolyte layer is on one main surface of the porous self-supporting film. The first binder contains a polymeric material. The porous self-supported film and the solid electrolyte layer are adhered with the first binder. The first binder exists on another main surface of the porous self-supporting film. The solid electrolyte layer includes solid electrolyte particles and second binder. The solid electrolyte particles have alkali metal ions conductivity. The second binder contains a polymeric material. The polymeric material of the second binder is a same material as the polymeric material of the first material.

In the secondary battery according to the first embodiment, water contained in the solvent of the aqueous electrolyte can be electrolyzed inside the negative electrode and near the negative electrode in the initial charge. This is because, during the initial charge, lithium ions are inserted in the negative electrode active material, and the potential of the negative electrode thus lowers. If this negative electrode potential becomes lower than the hydrogen generation potential, some water is decomposed into hydrogen ($H_2$) and hydroxide ions ($OH^-$) inside the negative electrode and near the negative electrode. Accordingly, pH of the aqueous electrolyte existing inside the negative electrode and near the negative electrode rises.

The hydrogen generation potential of the negative electrode depends on the pH of the aqueous electrolyte. That is, when the pH of the aqueous electrolyte which is in contact with the negative electrode becomes high, the hydrogen generation potential of the negative electrode lowers. Hence, after the initial charge, decomposition of water in the negative electrode becomes hard to occur.

A solid electrolyte layer including solid electrolyte particles having ionic conductivity of alkali metal ions has a characteristic to pass alkali metal ions such as lithium ions but hardly pass the aqueous solvent. In the secondary battery according to the first embodiment, since the separator including the solid electrolyte layer is located at least between the negative electrode and the positive electrode, the solvent contained in the aqueous electrolyte in contact with the negative electrode and the solvent contained in the aqueous electrolyte in contact with the positive electrode hardly mix with each other. Hence, the water in the positive electrode side hardly enters the negative electrode side. In addition, hydroxide ions generated on the negative electrode side hardly move to the positive electrode side. Accordingly, in the secondary battery according to the first embodiment, the pH of the aqueous electrolyte in contact with the negative electrode can be kept high. Thus, in the secondary battery according to the first embodiment, electrolysis of water in the negative electrode can be suppressed, and a long life can be implemented.

Here, when a film made of only solid electrolyte particles is used as a separator, a certain thickness is necessary to suppress internal short circuit. Accordingly, when the film made of only solid electrolyte particles is used as a separator, movement of water between the positive electrode and the negative electrode can be suppressed, but it is difficult to raise energy density.

On the other hand, when a porous self-supporting film such as a porous sheet or a nonwoven fabric is used as a separator, it is difficult to suppress the movement of water between the positive electrode and the negative electrode, but it is possible to suppress the internal short circuit.

In the separator included in the secondary battery according to the first embodiment, the solid electrolyte layer is provided on one side of the porous self-supporting film. This solid electrolyte layer is adhered to the porous self-supporting film with the same polymeric material as a binder for binding the solid electrolyte particles to each other. This polymeric material also exists on the main surface of the porous self-supporting film on the side where the solid electrolyte layer is not provided. When a separator having such a configuration is used, the movement of water between the positive electrode and the negative electrode can be suppressed, and, at the same time, the thickness of the separator can be reduced. In addition, the adhesion between the active material-containing layer and the porous self-supporting film is enhanced. Accordingly, the secondary battery according to the first embodiment including such a separator can implement high energy density and high life characteristics.

FIG. 1 is a sectional view schematically showing an example of the secondary battery according to the first embodiment. As shown in FIG. 1, a secondary battery 500 shown in FIG. 1 includes a negative electrode 51, a positive electrode 52, a separator 53, and an aqueous electrolyte AE. The secondary battery 500 shown in FIG. 1 is a lithium ion secondary battery. The lithium ion secondary battery will be described here as an example. However, the type of alkali metal ions to be inserted in and extracted from the negative electrode and the positive electrode is not particularly limited. As alkali metal ions other than lithium ions, for example, sodium ions can be used.

The negative electrode 51 includes a negative electrode current collector 510 and a negative electrode active material-containing layer 511. The negative electrode active material-containing layer 510 is supported on one main surface of the negative electrode current collector 510. The positive electrode 52 includes a positive electrode current collector 520 and a positive electrode active material-containing layer 521. The positive electrode active material-containing layer is supported on one main surface of the positive electrode current collector 520.

The separator 53 is located between the negative electrode active material-containing layer 511 and the positive electrode active material-containing layer 521. The separator 53 partitions the interior of the secondary battery 500 into the side of the negative electrode 51 where the negative electrode 51 is located and the side of the positive electrode 52 where the positive electrode 52 is located.

The aqueous electrolyte AE exists in a space located between the negative electrode current collector 510 and the positive electrode current collector 520. Examples of the space include holes in the negative electrode active material containing layer 511 and the positive electrode active material containing layer 521, the interfaces between the negative electrode active material-containing layer 511 and the positive electrode active material-containing layer 521 and the separator 53, and gaps in the separator 53. The aqueous electrolyte AE is an aqueous solution containing an aqueous solvent and an electrolyte salt dissolved in the aqueous solvent.

Figure 2:
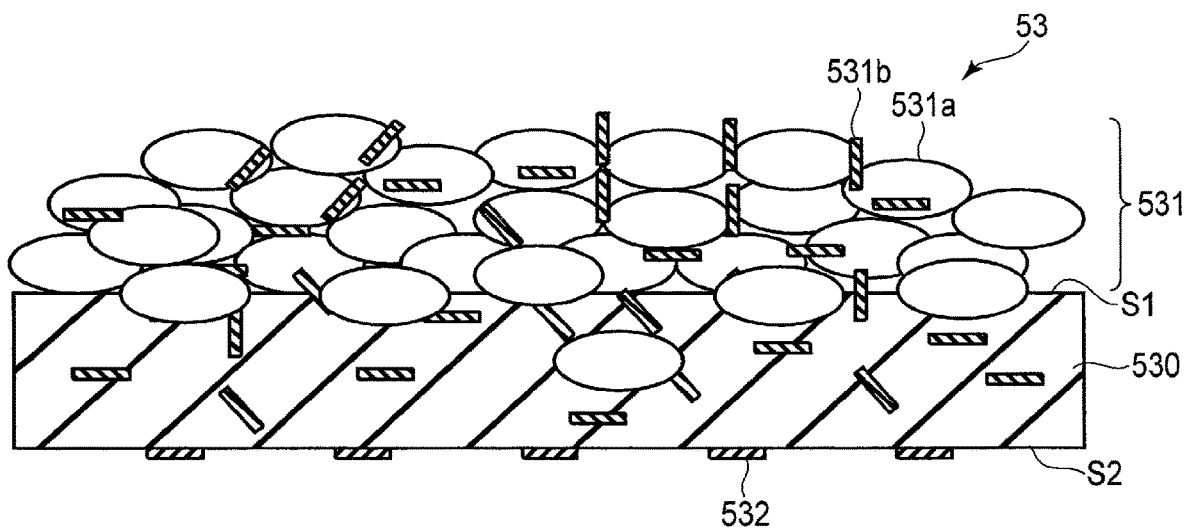
FIG. 2 is an enlarged sectional view of the separator of the secondary battery shown in FIG. 1.

FIG. 2 is an enlarged sectional view of the separator of the secondary battery shown in FIG. 1. The separator 53 shown in FIG. 2 includes a porous self-supporting film 530, a solid electrolyte layer 531, and a first binder 532.

The solid electrolyte layer 531 is provided on the porous self-supporting film 530. The solid electrolyte layer 531 includes solid electrolyte particles 531a and a second binder 531b. The second binder 531b exists in gaps among the solid electrolyte particles 531a.

The first binder 532 adheres the porous self-supporting film 530 and the solid electrolyte layer 531 to each other. The first binder 532 exists in a pore of the porous self-supporting film 530. The first binder 532 exists on a main surface S2 of the porous self-supporting film 530 opposite to a main surface S1 on which the solid electrolyte layer 531 is provided.

Details of the negative electrode, the positive electrode, the separator, the aqueous electrolyte, and a container will be described below.

1) Negative Electrode

The negative electrode can include a negative electrode current collector and a negative electrode active material-containing layer supported on the negative electrode current collector.

As the material of the negative electrode current collector, a substance that is electrochemically stable in the negative electrode potential range when the alkali metal ions are inserted or extracted is used. The negative electrode current collector is preferably, for example, an aluminum foil or an aluminum alloy foil containing at least one element selected from the group consisting of magnesium (Mg), titanium (Ti), zinc (Zn), manganese (Mn) iron (Fe), copper (Cu), and silicon (Si). The negative electrode current collector may have another form such as a porous body or a mesh. The thickness of the negative electrode current collector is preferably 5 μm○20 μm. A current collector having such a thickness can balance the strength of the electrode and weight reduction.

The negative electrode active material-containing layer contains the negative electrode active material. The negative electrode active material-containing layer may be supported on each main surface of the negative electrode current collector.

The porosity of the negative electrode active material-containing layer is preferably set to 20% to 50%. This makes it possible to obtain a negative electrode having good affinity for the aqueous electrolyte and having a high density. The porosity of the negative electrode active material-containing layer is more preferably 25% to 40%.

The porosity of the negative electrode active material-containing layer can be obtained by, for example, mercury porosimetry. More specifically, first, the pore distribution of the active material-containing layer is obtained by mercury porosimetry. Next, the total pore amount is calculated from the pore distribution. Next, the porosity can be calculated from the ratio of the total pore amount and the volume of the active material-containing layer.

The specific surface area of the negative electrode active material-containing layer in the BET method by nitrogen ($N_2$) adsorption is more preferably 3 $m^2$/g to 50 $m^2$/g. If the specific surface area of the negative electrode active material-containing layer is less than 3 $m^2$/g, the affinity between the negative electrode active material and the aqueous electrolyte may lower. As a result, the interface resistance of the negative electrode increases, and the output characteristic and the charge-and-discharge cycle characteristic may lower. On the other hand, if the specific surface area of the negative electrode active material-containing layer exceeds 50 $m^2$/g, an ionic species ionized from the electrolyte salt may be unevenly distributed on the negative electrode side, resulting in a shortage of an ionic species ionized from the electrolyte salt in the positive electrode. Hence, the output characteristic and the charge-and-discharge cycle characteristic may lower.

The specific surface area can be obtained by, for example, the following method. First, the secondary battery is disassembled, and a part of the negative electrode active material-containing layer is extracted. Next, the nitrogen gas adsorption amount (mL/g) of the sample is measured at each pressure P while a nitrogen gas pressure P (mmHg) is gradually increased in nitrogen gas at 77 K (boiling point of nitrogen). Then, an adsorption isotherm is obtained by plotting the adsorption amount of nitrogen gas with respect to each relative pressure $P/P_0$. The relative pressure $P/P_0$ is obtained by dividing the pressure P (mmHg) by a saturated vapor pressure $P_0$ (mmHg) of nitrogen gas. Then, a BET plot is calculated from the nitrogen adsorption isotherm and the BET equation, and a specific surface area is obtained using the BET plot. For the calculation of the BET plot, a BET multipoint method is used.

As the negative electrode active material, a compound whose lithium ion insertion/extraction potential is 1 V (vs. Li/Li$^+$) to 3 V (vs. Li/Li$^+$) as a potential based on metal lithium can be used. That is, the secondary battery according to the first embodiment can maintain the hydrogen generation potential of the negative electrode in a low state after the initial charge, as described above. Hence, a material whose lithium ion insertion/extraction potential has a relatively small lower limit value can be used as the negative electrode active material of the secondary battery. When such a negative electrode active material is used, the energy density of the secondary battery can be raised. For this reason, the secondary battery can implement the same energy density as that of a battery using a nonaqueous electrolyte.

As the negative electrode active material, more specifically, a titanium oxide or a titanium-containing oxide can be used. As the titanium-containing oxide, a lithium titanium composite oxide, a niobium titanium composite oxide, a sodium niobium titanium composite oxide and the like can be used. One type or two or more types of the titanium oxide and the titanium-containing oxide can be included in the negative electrode active material.

The titanium oxide includes, for example, a titanium oxide having a monoclinic structure, a titanium oxide having a rutile structure, and a titanium oxide having an anatase structure. For titanium oxides of these crystal structures, the composition before charge can be expressed as $TiO_2$, and the composition after charge can be expressed as $Li_xTiO_2$ (0≤x≤1). In addition, the structure of titanium oxide having a monoclinic structure before charge can be expressed as $TiO_2(B)$.

The lithium titanium composite oxide includes, for example, a lithium titanium composite oxide having a spinel structure (for example, the general formula is $Li_{4+x}Ti_5O_{12}$ (−1≤x≤3)), a lithium titanium composite oxide having a ramsdellite structure (for example, $Li_{2+x}Ti_3O_7$ (−1≤x≤3)), $Li_{1+x}Ti_2O_4$ (0≤x≤1), $Li_{1.1+x}Ti_{1.8}O_4$ (0≤x≤1), $Li_{1.07+x}Ti_{1.86}O_4$ (0≤x≤1), and $Li_xTiO_2$ (0<x≤1), and the like. The lithium titanium composite oxide may be a lithium titanium composite oxide in which a dopant is introduced.

The niobium titanium composite oxides include, for example, a material expressed as $Li_aTiM_bNb_{2±β}O_{7±σ}$ (0≤a≤5, 0≤b≤0.3, 0≤β≤0.3, 0≤σ≤0.3, M is at least one element selected from the group consisting of Fe, V, Mo, and Ta).

The sodium niobium titanium oxides include, for example, an orthorhombic Na-containing niobium titanium composite oxide represented by the general formula $Li_{2+v}Na_{2-w}M1_xTi_{6-y-z}Nb_yM2_zO_{14+δ}$ (0≤v≤4, 0≤w<2, 0≤x<2, 0<y<6, 0≤z<3, −0.5≤δ≤0.5, M1 includes at least one element selected from the group consisting of Cs, K, Sr, Ba, and Ca, and M2 includes at least one element selected from the group consisting of Zr, Sn, V, Ta, Mo, W, Fe, Co, Mn, and Al).

As the negative electrode active material, the titanium oxide having the anatase structure, the titanium oxide having the monoclinic structure, the lithium titanium composite oxide having the spinel structure, or a mixture thereof is preferably used. When one of these oxides is used as the negative electrode active material and a lithium manganese composite oxide is used as the positive electrode active material, a high electromotive force can be obtained.

The negative electrode active material is contained in the negative electrode active material-containing layer in a form of, for example, particles. The negative electrode active material particles can be primary particles, secondary particles as the aggregates of primary particles, or a mixture of single primary particles and secondary particles. The shape of a particle is not particularly limited and can be, for example, spherical, elliptical, flat, or fibrous.

The secondary particles of the negative electrode active material can be obtained by, for example, the following method. First, the raw materials of the active material are reactively synthesized to produce an active material precursor having an average particle size of 1 μm or less. After that, a calcination treatment is performed for the active material precursor, and a grinding treatment is performed using a grinder such as a ball mill or a jet mill. Next, in a calcination treatment, the active material precursor is agglomerated to grow secondary particles with a larger particle size.

The average particle size (diameter) of the secondary particles of the negative electrode active material is preferably 3 μm or more, and more preferably 5 μm to 20 μm. Within this range, since the surface area of the active material is small, decomposition of water can further be suppressed.

The average particle size of the primary particles of the negative electrode active material is preferably 1 μm or less. This shortens the diffusion distance of Li ions in the active material and increases the specific surface area. For this reason, excellent high input performance (rapid charge) can be obtained. On the other hand, if the average particle size of the primary particles of the negative electrode active material is small, agglomeration of the particles readily occurs. If agglomeration of the particles of the negative electrode active material occurs, the aqueous electrolyte is readily unevenly distributed on the negative electrode side in the secondary battery, and the ionic species may be exhausted in the positive electrode. For this reason, the average particle size of the primary particles of the negative electrode active material is preferably 0.001 μm or more. The average particle size of the primary particles of the negative electrode active material is more preferably 0.1 μm to 0.8 μm.

Note that each of the primary particle size and the secondary particle size means a particle size with which a volume integrated value becomes 50% in a particle size distribution obtained by a laser diffraction particle size distribution measuring apparatus. As the laser diffraction particle size distribution measuring apparatus, Shimadzu SALD-300 is used, for example. For measurement, luminous intensity distribution is measured 64 times at intervals of 2 seconds. As a sample used when performing the particle size distribution measurement, a dispersion obtained by diluting the negative electrode active material particles by N-methyl-2-pyrrolidone such that the concentration becomes 0.1 mass % to 1 mass % is used. Alternatively, a measurement sample obtained by dispersing 0.1 g of a negative electrode active material in 1 to 2 ml of distilled water containing a surfactant is used.

The specific surface area of the negative electrode active material in the BET method by nitrogen ($N_2$) adsorption falls within the range of, for example, 3 $m^2$/g to 200 $m^2$/g. If the specific surface area of the negative electrode active material falls within this range, the affinity between the negative electrode and the aqueous electrolyte can be made higher. The specific surface area can be obtained by, for example, the same method as that for the specific surface area of the negative electrode active material-containing layer.

The negative electrode active material-containing layer may contain a conductive agent, a binder, and the like in addition to the negative electrode active material.

The conductive agent is mixed as needed to raise current collection performance and suppress the contact resistance between the active material and the current collector. Examples of the conductive agent include carbonaceous materials such as acetylene black, Ketjen black, graphite, and coke. The conductive agent may be of one type, or two or more types may be used in mixture.

The binder has a function of binding the active material, the conductive agent, and the current collector. As the binder, at least one material selected from the group consisting of, for example, polytetrafluoroethylene (PTFE), polyvinylidene fluoride (PVdF), a cellulose-based polymer such as carboxymethylcellulose (CMC), fluorine-based rubber, styrene-butadiene rubber, an acrylic resin or a copolymer thereof, polyacrylic acid, and polyacrylonitrile can be used. The binder is not limited to these materials. The binder may be of one type, or two or more types may be used in mixture.

The mixing ratios of the negative electrode active material, the conductive agent, and the binder in the negative electrode active material-containing layer are preferably 70 mass % to 95 mass %, 3 mass % to 20 mass %, and 2 mass % to 10 mass %, respectively. If the mixing ratio of the conductive agent is 3 mass % or more, the conductivity of the negative electrode can be improved. If the mixing ratio of the conductive agent is 20 mass % or less, decomposition of the aqueous electrolyte on the conductive agent surface can be reduced. If the mixing ratio of the binder is 2 mass % or more, a sufficient electrode strength can be obtained. If the mixing ratio of the binder is 10 mass % or less, the insulating portion of the electrode can be decreased.

The negative electrode can be obtained by, for example, the following method. First, the active material, the conductive agent, and the binder are suspended in an appropriate solvent to prepare a slurry. Next, the slurry is applied to one surface or both surfaces of the current collector. The coating on the current collector is dried, thereby forming an active material-containing layer. After that, pressing is performed for the current collector and the active material-containing layer formed on it. As the active material-containing layer, the mixture of the active material, the conductive agent, and the binder formed into pellets may be used.

2) Positive Electrode

The positive electrode can include a positive electrode current collector and a positive electrode active material-containing layer supported on the positive electrode current collector.

The positive electrode current collector is made of, for example, a metal such as stainless steel, aluminum (Al), or titanium (Ti). The positive electrode current collector has a form of, for example, a foil, a porous body, or a mesh. To prevent corrosion by the reaction between the positive electrode current collector and the aqueous electrolyte, the surface of the positive electrode current collector may be covered with a different kind of element. The positive electrode current collector is preferably made of a material with excellent corrosion resistance and oxidation resistance, for example, a Ti foil. Note that when $Li_2SO_4$ is used as the aqueous electrolyte, Al may be used as the positive electrode current collector because corrosion does not progress.

The positive electrode active material-containing layer contains the positive electrode active material. The positive electrode active material-containing layer may be supported on each main surface of the positive electrode current collector. As the positive electrode active material, a compound whose lithium ion insertion/extraction potential is 2.5 V (vs. $Li/Li^+$) to 5.5 V (vs. $Li/Li^+$) as a potential based on metal lithium can be used. The positive electrode may contain one type of positive electrode active material or may contain two or more types of positive electrode active materials.

Examples of the positive electrode active material include a lithium manganese composite oxide, a lithium nickel composite oxide, a lithium cobalt aluminum composite oxide, a lithium nickel cobalt manganese composite oxide, a spinel type lithium manganese nickel composite oxide, a lithium manganese cobalt composite oxide, a lithium iron oxide, a lithium fluorinated iron sulfate, a phosphate compound having an olivine crystal structure (for example, $Li_xFePO_4$ ($0<x\leq1$), $Li_xMnPO_4$ ($0<x\leq1$)), and the like. The phosphate compound having an olivine crystal structure has excellent thermal stability.

Examples of the positive electrode active material capable of obtaining a high positive electrode potential are a lithium manganese composite oxide having a spinel structure such as $Li_xMn_2O_4$ ($0<x\leq1$) or $Li_xMnO_2$ ($0<x\leq1$), a lithium nickel aluminum composite oxide such as $Li_xNi_{1-y}Al_yO_2$ ($0<x\leq1$, and $0<y<1$), a lithium cobalt composite oxide such as $Li_xCoO_2$ ($0<x\leq1$), a lithium nickel cobalt composite oxide such as $Li_xNi_{1-y-z}Co_yMn_zO_2$ ($0<x\leq1$, $0<y<1$, and $0\leq z<1$), a lithium manganese cobalt composite oxide such as $Li_xMn_yCo_{1-y}O_2$ ($0<x\leq1$, and $0<y<1$), a spinel type lithium manganese nickel composite oxide such as $Li_xMn_{1-y}Ni_yO_4$ ($0<x\leq1$, $0<y<2$, and $0<1-y<1$), a lithium phosphorus oxide such as having an olivine structure such as $Li_xFePO_4$ ($0<x\leq1$), $Li_xFe_{1-y}Mn_yPO_4$ ($0<x\leq1$, $0<y\leq1$), or $Li_xCoPO_4$ ($0<x\leq1$), and a fluorinated iron sulfate (for example, $Li_xFeSO_4F$ ($0<x\leq1$)).

The positive electrode active material is preferably at least one material selected from the group consisting of a lithium cobalt composite oxide, a lithium manganese composite oxide, and a lithium phosphorus oxide having an olivine structure. The operating potentials of these active materials are 3.5 V (vs. $Li/Li^+$) to 4.2 V (vs. $Li/Li^+$). That is, the operating potentials of these active materials are relatively high. When these positive electrode active materials are used in combination with the above-described negative electrode active material such as a spinel type lithium titanate or an anatase type titanium oxide, a high battery voltage can be obtained.

The positive electrode active material is contained in the positive electrode in a form of, for example, particles. The positive electrode active material particles can be single primary particles, secondary particles as the aggregates of primary particles, or a mixture of primary particles and secondary particles. The shape of a particle is not particularly limited and can be, for example, spherical, elliptical, flat, or fibrous.

The average particle size (diameter) of the primary particles of the positive electrode active material is preferably 10 μm or less, and more preferably 0.1 μm to 5 μm. The average particle size (diameter) of the secondary particles of the positive electrode active material is preferably 100 μm or less, and more preferably 10 μm to 50 μm.

The primary particle size and the secondary particle size of the positive electrode active material can be measured by the same method as that for the negative electrode active material particles.

The positive electrode active material-containing layer may contain a conductive agent, a binder, and the like in addition to the positive electrode active material.

The conductive agent is mixed as needed to raise current collection performance and suppress the contact resistance between the active material and the current collector. Examples of the conductive agent include carbonaceous materials such as acetylene black, Ketjen black, graphite, and coke. The conductive agent may be of one type, or two or more types may be used in mixture.

As the binder, for example, polytetrafluoroethylene (PTFE), polyvinylidene fluoride (PVdF), fluorine-based rubber, ethylene-butadiene rubber, polypropylene (PP), polyethylene (PE), carboxymethylcellulose (CMC), polyimide (PI), polyacrylimide (PAI), or the like can be used. The binder may be of one type, or two or more types may be used in mixture.

The mixing ratios of the positive electrode active material, the conductive agent, and the binder in the positive electrode active material-containing layer are preferably 70 mass % to 95 mass %, 3 mass % to 20 mass %, and 2 mass % to 10 mass %, respectively. If the mixing ratio of the conductive agent is 3 mass % or more, the conductivity of the positive electrode can be improved. If the mixing ratio of the conductive agent is 20 mass % or less, decomposition of the aqueous electrolyte on the conductive agent surface can be reduced. If the mixing ratio of the binder is 2 mass % or more, a sufficient electrode strength can be obtained. If the mixing ratio of the binder is 10 mass % or less, the insulating portion of the electrode can be decreased.

The positive electrode can be obtained by, for example, the following method. First, the active material, the conductive agent, and the binder are suspended in an appropriate solvent to prepare a slurry. Next, the slurry is applied to one surface or both surfaces of the current collector. The coating on the current collector is dried, thereby forming an active material-containing layer. After that, pressing is performed for the current collector and the active material-containing layer formed on it. As the active material-containing layer, the mixture of the active material, the conductive agent, and the binder formed into pellets may be used.

3) Separator

The separator has electrical insulating properties and prevents the negative electrode and the positive electrode from being in contact with each other to cause internal short circuit. The separator is located at least between the positive electrode and the negative electrode. The separator is preferably in contact with the negative electrode, and more preferably in contact with both the positive electrode and the negative electrode. The separator is preferably located to cover the main surface of the negative electrode. In addition, the separator preferably covers one or more side surfaces as well in addition to the main surface of the negative electrode. When such an arrangement is employed, in the secondary battery, the negative electrode side and the positive electrode side can be more correctly spaced apart, and electrolysis of water can further be suppressed. Note that the secondary battery according to the first embodiment may include a plurality of separators. In this case, the negative electrode and the positive electrode can be located between the separators.

The separator includes a porous self-supporting film, a solid electrolyte layer, and a first binder. The separator has a two-layer structure of a porous self-supporting film and a solid electrolyte layer provided on one main surface of the porous self-supporting film. The porous self-supporting film and the solid electrolyte layer are bound with a binder of the same material as a binder contained in the solid electrolyte layer and integrated.

In the secondary battery according to the first embodiment, it is preferable that the negative electrode, the solid electrolyte layer, the porous self-supporting film, and the positive electrode are arranged in this order. That is, the solid electrolyte layer is preferably located between the negative electrode and the porous self-supporting film, more preferably in contact with the negative electrode. On the other hand, the porous self-supporting film is preferably located between the positive electrode and the solid electrolyte layer, more preferably in contact with the positive electrode. When the solid electrolyte layer is located near the negative electrode and the porous self-supporting film is located near the positive electrode, it is easy to maintain the pH on the negative electrode side at a high level while increasing the diffusibility of alkali metal ions, and the life characteristics of the secondary battery can be enhanced.

The thickness of the separator is preferably 100 μm or less, and more preferably 70 μm or less from the viewpoint of raising the energy density of the secondary battery. Since this separator has a two-layer structure of a porous self-supporting film and a solid electrolyte layer, even if the thickness of the separator is reduced, both water shielding property and sufficient strength can be achieved. From the viewpoint of raising the mechanical strength, the thickness of the separator is preferably 50 μm or more.

The separator preferably has water shielding property. The level of the water shielding property of the separator depends on the type of the solid electrolyte particles included in the solid electrolyte layer, denseness of the solid electrolyte layer, and the like. The water shielding property of the separator can be measured, for example, by the following method.

First, the secondary battery is disassembled, and the separator is extracted. Next, a portion of the separator is cut to obtain a test piece. The test piece has, for example, a square plate shape whose side is 2 cm long. Next, an H-type cell is prepared. The H-type cell includes a pair of glass cells. Each glass cell has a columnar glass container body having a first opening and a tube portion vertically connected to the side surface of the glass container body and having a second opening. The pair of glass cells constitutes a connecting portion such that the second openings of the tube portions of the pair of glass cells face each other. Next, the test piece is fixed to the tube portion of one of the glass cells so that an interior space of the connecting portion is separated by the test piece.

Then, the aqueous electrolyte is poured into one of the glass cells. On the other hand, pure water is poured into the other glass cell and allowed to stand for a fixed time. As the aqueous electrolyte, for example, an aqueous solution having a lithium chloride (LiCl) concentration of 3 mol/L and a lithium sulfate ($Li_2SO_4$) concentration of 0.25 mol/L is used. The test temperature is room temperature, and the test time is, for example, 1 hour. Next, electric conductivity of pure water in the other glass cell is measured to obtain electric conductivity Al after the test. For example, ion chromatography is used as an electric conductivity measuring device.

Next, pure water is poured into one of the glass cells in place of the aqueous electrolyte, a similar test is performed, and the electric conductivity of pure water in the other glass cell at that time is measured. The electric conductivity at this time is taken as a reference value A.

When a difference (Al-A) between the electric conductivity Al of pure water after the test and the reference value A is 1000 μS/cm or less, it can be said that the separator has the water shielding property in the scope of the present invention. When the electric conductivity Al is 500 μS/cm or less, it can be said that the separator has high water shielding property in the scope of the present invention.

The separator preferably has flexibility. When the separator has flexibility, a defect such as a crack becomes hard to occur in the separator. Hence, when a separator having flexibility is used, the negative electrode side and the positive electrode side can be more correctly spaced apart, and electrolysis of water can further be suppressed in the secondary battery. The level of the flexibility of the separator may depend on the type and blending amount of the second binder contained in the solid electrolyte layer, and the like.

Whether the separator has flexibility can be determined by, for example, conducting a bending test for the separator. That is, first, the secondary battery is disassembled, and the separator is extracted. Next, the separator is cut to obtain a test piece. The test piece has, for example, a strip shape that is 2 cm long in the horizontal direction and 10 cm long in the vertical direction. Next, the test piece is immersed in water at a temperature of 23° C. for 24 hrs and dried. Then, a bending test is performed for the test piece after drying using a method defined in JIS C 5016: 1994 "Test methods for flexible printed wiring boards". In the bending test, the bending radius is, for example, 3 mm, and the bending count is 100. The test piece after the bending test is visually observed. If there is neither crack nor rupture, the separator can be considered to have flexibility.

The level of the flexibility of the separator can be determined by comparing the results of the above-described water-shielding test obtained on the test piece before the bending test with the results of the water-shielding test obtained on the test piece after the bending test. That is, if the difference between the electric conductivity Al of pure water obtained in the test piece before the bending test and the electric conductivity Al of pure water obtained in the test piece after the bending test is 500 μS/cm or less, it can be said that the separator is excellent in flexibility.

The porous self-supporting film can be impregnated with a nonaqueous electrolyte. The porous self-supporting film has a first main surface which is one main surface and a second main surface which is the other main surface. The solid electrolyte layer is carried on the first main surface. The first binder is carried on the second main surface.

The porous self-supporting film is, for example, a porous resin sheet or a nonwoven fabric. As the material of the porous resin sheet or nonwoven fabric, for example, polyethylene (PE), polypropylene (PP), cellulose, or polyvinylidene fluoride (PVdF) can be used. The porous self-supporting film is preferably a cellulose nonwoven fabric.

The thickness of the porous self-supporting film is, for example, 3 µm or more, preferably 5 µm or more. If the thickness of the porous self-supporting film is thick, the mechanical strength of the separator is increased, and internal short circuit of the secondary battery becomes hard to occur.

The thickness of the porous self-supporting film is, for example, 50 µm or less, preferably 30 µm or less. When the thickness of the porous self-supporting film is thin, the internal resistance of the secondary battery tends to decrease, and the volumetric energy density of the secondary battery tends to increase.

The solid electrolyte layer includes solid electrolyte particles and a second binder. The solid electrolyte layer covers at least a portion of the first main surface of the porous self-supporting film. It is preferable that the solid electrolyte layer covers the entire first main surface of the porous self-supporting film. It is preferable that the solid electrolyte layer does not cover a side surface of the porous self-supporting film. The solid electrolyte layer covers only the first main surface of the porous self-supporting film, so that the water shielding property of the separator and the conductivity of alkali metal ions can be enhanced. The solid electrolyte layer is preferably a non-self-supporting film directly provided on the first main surface of the porous self-supporting film.

The separator can pass a monovalent cation. Examples of the monovalent cation are alkali metal ions such as a lithium ion and a sodium ion. On the other hand, the separator hardly passes a cation and an anion of bivalence or more valence. The separator preferably selectively passes the monovalent cation.

The separator hardly passes the solvent of the aqueous electrolyte. That is, it is preferable that solvated alkali metal ions can enter the separator, but the solvated alkali metal ions cannot pass through the separator. In the separator, the solvated alkali metal ions can be desolvated.

The thickness of the solid electrolyte layer is, for example, 3 µm or more, preferably 5 µm or more. When the thickness of the solid electrolyte layer is thick, the solid electrolyte layer hardly passes an aqueous solvent, and the life of the secondary battery can be increased. The thickness of the solid electrolyte layer can be measured by, for example, scanning electron microscope (SEM) observation.

The thickness of the solid electrolyte layer is, for example, 90 µm or less, preferably 70 µm or less. When the thickness of the solid electrolyte layer is thin, the internal resistance of the secondary battery tends to decrease, and the volumetric energy density of the secondary battery tends to increase.

The solid electrolyte particles have ionic conductivity of alkali metal ions. The solid electrolyte particles are preferably excellent in lithium ion conductivity. The solid electrolyte particles preferably have high waterproofness.

The solid electrolyte particles are preferably the main component of the solid electrolyte layer. From the viewpoint of increasing the denseness of the solid electrolyte layer, the ratio of the solid electrolyte particles in the solid electrolyte layer is preferably 60 mass % or more, more preferably 70 mass % or more, and much more preferably 75 mass % or more.

From the viewpoint of increasing the flexibility of the solid electrolyte layer, the ratio of the solid electrolyte particles in the solid electrolyte layer is preferably 95 mass % or less, more preferably 94 mass % or less, and much more preferably 93 mass % or less. The ratio of the solid electrolyte particles in the solid electrolyte layer can be calculated by thermogravimetry (TG) analysis.

The shape of a solid electrolyte particle is not particularly limited and can be, for example, spherical, elliptical, flat, or fibrous. From the viewpoint of improving the alkali metal ion conductivity, the average particle size of the solid electrolyte particles is preferably 100 µm or less, more preferably 70 µm or less, and much more preferably 50 µm or less. The average particle size of the solid electrolyte particles do not particularly have a lower limit value. For example, the lower limit value of the average particle size is 0.05 µm or more.

Note that average particle size of the solid electrolyte particles means a particle size with which a volume integrated value becomes 50% in a particle size distribution obtained by a laser diffraction particle size distribution measuring apparatus. As a sample used when performing the particle size distribution measurement, a dispersion obtained by diluting the solid electrolyte particles by ethanol such that the concentration becomes 0.01 mass % to 5 mass % is used.

As the solid electrolyte particles, an inorganic solid electrolyte is preferably used. As the inorganic solid electrolyte, for example, an oxide-based solid electrolyte or a sulfide-based solid electrolyte can be used. As the oxide-based solid electrolyte, a lithium phosphate solid electrolyte having a NASICON structure and represented by a general formula $LiM_2(PO_4)_3$ is preferably used. M in the formula is preferably at least one element selected from the group consisting of titanium (Ti), germanium (Ge), strontium (Sr), zirconium (Zr), tin (Sn), and aluminum (Al). The element M preferably includes Al and one of Ge, Zr, and Ti.

Detailed examples of the lithium phosphate solid electrolyte having the NASICON structure include LATP $(Li_{1+x}Al_xTi_{2-x}(PO_4)_3)$, $Li_{1+x}Al_xGe_{2-x}(PO_4)_3$, and $Li_{1-x}Al_xZr_{2-x}(PO_4)_3$. In the above formula, x falls within the range of $0<x\le5$, x preferably falls within the range of $0<x\le2$, x more preferably falls within the range of $0.1\le x\le0.5$. As the solid electrolyte, LATP is preferably used. LATP is excellent in waterproofness and hardly causes hydrolysis in the secondary battery.

As the oxide-based solid electrolyte, LIPON $(Li_{2.9}PO_{3.3}N_{0.40})$ in an amorphous state or LLZ $(Li_7La_3Zr_2O_{12})$ having a garnet structure may be used. The solid electrolyte may be of one type, or two or more types may be used in mixture.

As the solid electrolyte particles, a sodium containing solid electrolyte may be used. The sodium containing solid electrolyte is excellent in the ionic conductivity of sodium ions. As the sodium containing solid electrolyte, β-alumina, a sodium phosphorus sulfide, a sodium phosphorus oxide, or the like can be used. The sodium ions containing solid electrolyte preferably has a glass-ceramic form.

The second binder is formed of a polymeric material. The second binder can exist in gaps among the solid electrolyte particles. The second binder improves the binding properties of the solid electrolyte particles.

From the viewpoint of increasing the flexibility of the solid electrolyte layer, the ratio of the second binder in the solid electrolyte layer is preferably 1 mass % or more, more preferably 3 mass % or more, and much more preferably 10 mass % or more.

From the viewpoint of increasing the lithium ion conductivity of the solid electrolyte layer, the ratio of the second binder in the solid electrolyte layer is preferably 20 mass % or less, more preferably 10 mass % or less, and much more preferably 5 mass % or less. The ratio of the second binder in the solid electrolyte layer can be calculated by thermogravimetry (TG) analysis.

The weight-average molecular weight of the polymeric material is, for example, 3,000 or more. When the weight-average molecular weight of the polymeric material is 3,000 or more, the binding properties of the solid electrolyte particles can further be improved. The weight-average molecular weight of the polymeric material is preferably 3,000 to 5,000,000, more preferably 5,000 to 2,000,000, and much more preferably 10,000 to 1,000,000. The weight-average molecular weight of the polymeric material can be obtained by gel permeation chromatography (GPC).

The polymeric material can be a polymer made of a single monomer unit, a copolymer made of a plurality of monomer units, or a mixture thereof. The polymeric material preferably contains a monomer unit constituted by a hydrocarbon with a functional group including one type or two or more types of elements selected from the group consisting of oxygen (O), sulfur (S), nitrogen (N), and fluorine (F). In the polymeric material, the ratio of a portion formed from the monomer unit is preferably 70 mol % or more. The monomer unit will be referred to as a first monomer unit hereinafter. Additionally, in a copolymer, a monomer unit other than the first monomer unit will be referred to as a second monomer unit. The copolymer of the first monomer unit and the second monomer unit may be an alternating copolymer, a random copolymer, or a block copolymer.

If the ratio of the portion formed from the first monomer unit in the polymeric material is lower than 70 mol %, the solid electrolyte layer may readily pass water, and as a result, the charge-and-discharge efficiency of the battery may lower. The ratio of the portion formed from the first monomer unit in the polymeric material is preferably 90 mol % or more. More preferably, the ratio of the portion formed from the first monomer unit in the polymeric material is preferably 100 mol %, that is, the polymeric material is a polymer formed from only the first monomer unit.

The first monomer unit may be a compound whose side chain has a functional group including one type or two or more types of elements selected from the group consisting of oxygen (O), sulfur (S), nitrogen (N), and fluorine (F) and whose main chain is formed from a carbon-to-carbon bond. The hydrocarbon may have one type or two or more types of functional groups each including one type or two or more types of elements selected from the group consisting of oxygen (O), sulfur (S), nitrogen (N), and fluorine (F). The functional group in the first monomer unit raises the conductivity of the alkali metal ions that pass through the solid electrolyte layer.

The hydrocarbon that forms the first monomer unit preferably has a functional group including at least one element selected from the group consisting of oxygen (O), sulfur (S), and nitrogen (N). When the first monomer unit has such a functional group, the conductivity of the alkali metal ions in the solid electrolyte layer tends to further rise so as to lower the internal resistance.

The functional group contained in the first monomer unit is preferably at least one functional group selected from the group consisting of a formal group, a butyral group, a carbonylmethyl ester group, an acetyl group, a carbonyl group, a hydroxy group, and a fluoro group. In addition, the first monomer unit preferably contains at least one of a carbonyl group and a hydroxy group in a functional group, and more preferably contains both of them.

The first monomer unit can be represented by the following formula.

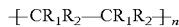

In the formula, $R_1$ is preferably selected for the group consisting of hydrogen (H), an alkyl group, and an amino group. In addition, $R_2$ is preferably selected from the group consisting of a hydroxy group (—OH), —$OR_1$, —$COOR_1$, —$OCOR_1$, —$OCH(R_1)O$—, —CN, —$N(R_1)_3$, and —$SO_2R_1$.

As the first monomer unit, at least one type or two or more types of monomer units selected from, for example, the group consisting of vinyl formal, vinyl alcohol, vinyl acetate, vinyl acetal, vinyl butyral, acrylic acid and a derivative thereof, methacrylic acid and a derivative thereof, acrylonitrile, acrylamide and a derivative thereof, styrenesulfonic acid, and tetrafluoroethylene can be used.

The polymeric material preferably contains at least one material selected from the group consisting of polyvinyl formal, polyvinyl alcohol, polyvinyl acetal, polyvinyl butyral, polymethyl methacrylate, and polytetrafluoroethylene.

Examples of structural formulas of compounds usable as the polymeric material will be described below.

The structural formula of polyvinyl formal is as follows. In the formula, preferably, a is 50 to 80, b is 0 to 5, and c is 15 to 50.

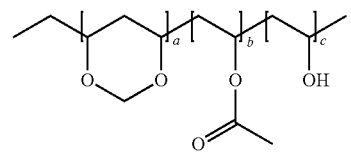

The structural formula of polyvinyl butyral is as follows. In the formula, preferably, 1 is 50 to 80, m is 0 to 10, and n is 10 to 50.

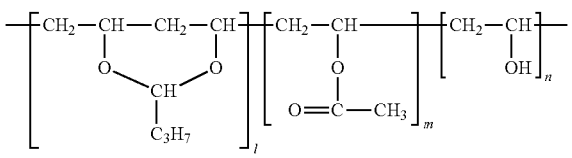

The structural formula of polyvinyl alcohol is as follows. In the formula, preferably, n is 70 to 20,000.

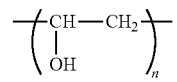

The structural formula of polymethyl methacrylate is as follows. In the formula, preferably, n is 30 to 10,000.

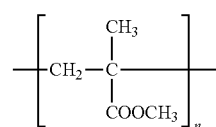

The second monomer unit is a compound other than the first monomer unit, that is, a hydrocarbon that does not have a functional group including one type or two or more types of elements selected from the group consisting of oxygen (O), sulfur (S), nitrogen (N), and fluorine (F), or a material that has the functional group but is not a hydrocarbon. Examples of the second monomer unit are ethylene oxide and styrene can be used. Examples of a polymer formed from the second monomer unit are polyethylene oxide (PEO) and polystyrene (PS).

The types of the functional groups contained in the first monomer unit and the second monomer unit can be identified by infrared spectroscopy (Fourier Transform Infrared Spectroscopy: FT-IR). Whether the first monomer unit is formed from a hydrocarbon can be determined by nuclear magnetic resonance (NMR). In the copolymer of the first monomer unit and the second monomer unit, the ratio of the portion formed from the first monomer unit can be calculated by NMR.

The polymeric material can contain an aqueous electrolyte. The ratio of the aqueous electrolyte that the polymeric material may contain can be grasped based on the water absorption capacity. Here, the water absorption capacity of the polymeric material is given by ([M1−M]/M×100) that is a value obtained by dividing a value obtained by subtracting a mass M of the polymeric material before immersion from a mass M1 of the polymeric material after it is immersed in water at a temperature of 23° C. for 24 hrs by the mass M of the polymeric material before immersion. The water absorption capacity of the polymeric material is considered to be associated with the polarity of the polymeric material.

When a polymeric material with a high water absorption capacity is used, the alkali metal ion conductivity of the solid electrolyte layer tends to rise. In addition, when a polymeric material having a high water absorption capacity is used, the binding force between the solid electrolyte particles and the polymeric material increase, and therefore, the flexibility of the solid electrolyte layer can be raised. The water absorption capacity of the polymeric material is preferably 0.01% or more, more preferably 0.5% or more, and much more preferably 2% or more.

When a polymeric material with a low water absorption capacity is used, the strength of the solid electrolyte layer can be increased. That is, if the water absorption capacity of the polymeric material is too high, the solid electrolyte layer may be swelled by the aqueous electrolyte. In addition, if the water absorption capacity of the polymeric material is too high, the polymeric material in the solid electrolyte layer may flow out into the aqueous electrolyte. The water absorption capacity of the polymeric material is preferably 15% or less, more preferably 10% or less, much more preferably 7% or less, and particularly preferably 3% or less.

The solid electrolyte layer may contain a plasticizing agent or an electrolyte salt in addition to the solid electrolyte particles and the second binder. For example, if the solid electrolyte layer contains an electrolyte salt, the alkali metal ion conductivity of the separator can further be raised.

The ratio of the electrolyte salt in the solid electrolyte layer is preferably from 0.01 mass % to 10 mass %, and more preferably from 0.05 mass % to 5 mass %. The ratio of the electrolyte salt in the solid electrolyte layer can be calculated by thermogravimetry (TG) analysis.

Whether the solid electrolyte layer contains an electrolyte salt can be confirmed, for example, based on an alkali metal ion distribution obtained by energy dispersive X-ray spectrometry (EDX) for a section of the solid electrolyte layer. That is, if the solid electrolyte layer is made of a material that does not contain an electrolyte salt, the alkali metal ions remain in the surface layer of the polymeric material in the solid electrolyte layer, and therefore, rarely exist inside the solid electrolyte layer. Hence, a concentration gradient representing that the concentration of alkali metal ions is high in the surface layer of the solid electrolyte layer, and the concentration of alkali metal ions is low inside the solid electrolyte layer can be observed. On the other hand, if the solid electrolyte layer is made of a material containing an electrolyte salt, it can be confirmed that the alkali metal ions evenly exist inside the solid electrolyte layer as well.

On the other hand, if the electrolyte salt contained in the solid electrolyte layer and the electrolyte salt contained in the aqueous electrolyte are of different types, it can be found based on the difference of existing ions that the solid electrolyte layer contains an electrolyte salt different from that in the aqueous electrolyte. For example, when lithium chloride (LiCl) is used as the aqueous electrolyte, and LiTFSI (lithium bis(fluorosulfonyl)imide) is used as the solid electrolyte layer, the existence of (fluorosulfonyl)imide ions can be confirmed in the solid electrolyte layer. On the other hand, in the aqueous electrolyte on the negative electrode side, the existence of the (f luorosulfonyl)imide ions cannot be confirmed, or the (fluorosulfonyl)imide ions exist at a very low concentration.

As the electrolyte salt, a lithium salt, a sodium salt, or a mixture thereof is preferably used. One type or two or more types of electrolyte salts can be used.

As the lithium salt, for example, lithium chloride (LiCl), lithium bromide (LiBr), lithium hydroxide (LiOH), lithium sulfate ($Li_2SO_4$), lithium nitrate ($LiNO_3$), lithium acetate ($CH_3COOLi$), lithium oxalate ($Li_2C_2O_4$), lithium carbonate ($Li_2CO_3$), lithium bis(trifluoromethanesulfonyl)imide (LiTFSI: $LiN(SO_2CF_3)_2$) lithium bis(fluorosulfonyl)imide (LiFSI: $LiN(SO_2F)_2$), lithium bis(oxalate)borate (LiBOB: $LiB[(OCO)_2]_2$), or the like can be used.

As the sodium salt, for example, sodium chloride (NaCl), sodium sulfate ($Na_2SO_4$), sodium hydroxide (NaOH), sodium nitrate ($NaNO_3$), sodium trifluoromethanesulfonyl amide (NaTFSA), or the like can be used.

The first binder is formed of the same polymeric material as the second binder. The first binder covers a portion of the second main surface of the porous self-supporting film. The first and second binders exist at an interface between the porous self-supporting film and the solid electrolyte layer and integrate the porous self-supporting film and the solid electrolyte layer with each other. In addition, the first binder enhances the adhesion between the porous self-supporting film and the active material-containing layer. The fact that the first binder is formed of the same polymeric material as the second binder and exists on the second main surface of the porous self-supporting film can be confirmed by analyzing the main surface of the solid electrolyte layer and the second main surface of the porous self-supporting film by the microscopic ATR (Attenuated Total Reflection) method.

The first binder may exist on an inner wall of a pore of the porous self-supporting film. This can be confirmed by performing SEM observation on the second main surface of the porous self-supporting film. The first binder may have a concentration gradient such that the abundance ratio decreases as going from the first main surface to the second main surface of the porous self-supporting film.

Next, a method of manufacturing a separator will be described.

First, solid electrolyte particles, a polymeric material, and a solvent are mixed to obtain a solution mixture. In the solution mixture, the mass ratio of the solid electrolyte particles and the polymeric material is preferably set to 50:50 to 98:2. Note that an electrolyte salt may be optionally added to the solution mixture. In this case, in the solution mixture, the mass ratio of the solid electrolyte particles, the polymeric material, and the electrolyte salt is preferably set to 50:40:10 to 96:2:2.

As the solvent, a solvent capable of dissolving a polymeric material is preferably used. Examples of the solvent include alcohols such as ethanol, methanol, isopropyl alcohol, normal propyl alcohol and benzyl alcohol, ketones such as acetone, methyl ethyl ketone, methyl isobutyl ketone, cyclohexanone and diacetone alcohol, esters such as ethyl acetate, methyl acetate, butyl acetate, ethyl lactate, methyl lactate and butyl lactate, ethers such as methyl cellosolve, ethyl cellosolve, butyl cellosolve, 1,4-dioxane and tetrahydrofuran, glycols such as ethylene glycol monoethyl ether acetate, propylene glycol monomethyl ether acetate, butyl carbitol acetate, and ethyl carbitol acetate, glycol ethers such as methyl carbitol, ethyl carbitol, and butyl carbitol, aprotic polar solvents such as dimethylformamide, dimethylacetamide, acetonitrile, valeronitrile, N-methyl-2-pyrrolidone, N-ethyl-2-pyrrolidone and γ-butyrolactam, cyclic carboxylic acid esters such as gamma-butyrolactone, gamma-valerorolactone, gamma-caprolactone and epsilon-caprolactone, and chain carbonate compounds such as dimethyl carbonate, diethyl carbonate, di-n-propyl carbonate, diisopropyl carbonate, n-propyl isopropyl carbonate, ethyl methyl carbonate, and methyl n-propyl carbonate.

The concentration of solid contents in the solution mixture is preferably set to 30 mass % to 60 mass %. Here, the solid content concentration means the total concentration of the mass of solid electrolyte particles, the mass of the polymeric material, and the mass of an arbitrarily added additive in the solution mixture. When a slurry having a solid content concentration of 30 mass % or more is used, the pores of the porous self-supporting film are less likely to be blocked by the polymeric material in the slurry, so that the aqueous electrolyte impregnating property of the porous self-supporting film becomes hard to lower.

Next, the solution mixture is sufficiently stirred using a dispersing machine such as a ball mill, thereby obtaining a slurry. Next, the slurry is applied on the first main surface of the porous self-supporting film, for example, by a doctor blade method. At this time, while the solid electrolyte particles in the slurry hardly enter the pores of the porous self-supporting film, the solvent in the slurry enters the pores of the porous self-supporting film and reaches the second main surface. Since at least a portion of the polymeric material is dissolved in the slurry, the polymeric material also reaches the second main surface from the first main surface of the porous self-supporting film, and a coating is formed on at least a portion of the second main surface. Next, the coating is dried to remove the solvent, whereby it is possible to obtain a separator including a solid electrolyte layer containing the second binder and the first binder existing on the second main surface of the porous self-supporting film.

The above-described separator has a two-layer structure of the porous self-supporting film and the solid electrolyte layer. The porous self-supporting film and the solid electrolyte layer are adhered with the same binder as the binder contained in the solid electrolyte layer. As a result, the strength of the separator can be further increased as compared with a separator in which the porous self-supporting film and the solid electrolyte layer are not bound by the binder, or a separator in which the porous self-supporting film and the solid electrolyte layer are bound with a material different from the binder contained in the solid electrolyte layer. Accordingly, in this separator, the thickness of the solid electrolyte layer can be reduced. Thus, when the separator is used, the internal resistance inside the secondary battery decreases, and, at the same time, the volume and mass energy density of the secondary battery can be increased.

The separator has a two-layer structure of a porous self-supporting film having a high aqueous electrolyte impregnating property and a solid electrolyte layer easily selectively passing only alkali metal ions. Accordingly, movement of water between the positive electrode and the negative electrode can be suppressed, and, at the same time, the diffusibility of alkali metal ions can be enhanced. Thus, when this separator is used, a secondary battery excellent in life characteristics can be implemented.

From the above, when the above-described separator is used, a secondary battery having high energy density and high life performance can be implemented.

4) Aqueous Electrolyte

The aqueous electrolyte contains an aqueous solvent and an electrolyte salt. The aqueous electrolyte may be a liquid. A liquid aqueous electrolyte is prepared by dissolving the electrolyte salt serving as a solute in the aqueous solvent.

As the electrolyte salt, for example, a lithium salt, a sodium salt, or a mixture thereof can be used. As the lithium salt or sodium salt, the same salt that can be contained in the solid electrolyte layer can be used. As the lithium salt, LiCl is preferably contained. When LiCl is used, the lithium ion concentration of the aqueous electrolyte can be made high. Additionally, the lithium salt preferably contains at least one of $LiSO_4$ and LiOH in addition to LiCl.

The mol concentration of lithium ions in the aqueous electrolyte is preferably 3 mol/L or more, more preferably 6 mol/L or more, and much more preferably 12 mol/L or more. When the concentration of the lithium ions in the aqueous electrolyte is high, electrolysis of the aqueous solvent in the negative electrode can easily be suppressed, and hydrogen generation from the negative electrode tends to be little.

In the aqueous electrolyte, the aqueous solvent amount is preferably 1 mol or more relative to 1 mol of the salt serving as a solute. In a more preferable form, the aqueous solvent amount relative to 1 mol of the salt serving as a solute is 3.5 mol or more.

The aqueous electrolyte preferably contains, as an anion species, at least one anion species selected from the group consisting of a chloride ion ($Cl^-$), a hydroxide ion ($OH^-$), a sulphate ion ($SO_4^{2-}$), and a nitrate ion ($NO_3^-$).

The pH of the aqueous electrolyte is preferably 3 to 14, and more preferably 4 to 13.

In addition, the pH of the aqueous electrolyte on the negative electrode side and that on the positive electrode side are preferably different after the initial charge. In the secondary battery after the initial charge, the pH of the aqueous electrolyte on the negative electrode side is preferably 3 or more, more preferably 5 or more, and much more preferably 7 or more. In the secondary battery after the initial charge, the pH of the aqueous electrolyte on the positive electrode side preferably falls within the range of 0 to 7, and more preferably falls within the range of 0 to 6.

The pHs of the aqueous electrolyte on the negative electrode side and the positive electrode side can be obtained by, for example, disassembling the secondary battery and measuring the pH of the aqueous electrolyte existing between the separator and the negative electrode and the pH of the aqueous electrolyte existing between the separator and the positive electrode.

As the aqueous solvent, a solution containing water can be used. Here the solution containing water may be pure water or a solvent mixture of water and an organic solvent.

The aqueous electrolyte may be a gel electrolyte. The gel electrolyte is prepared by mixing the above-described liquid aqueous electrolyte and a high-molecular compound and compounding them. As the high-molecular compound, for example, polyvinylidene fluoride (PVdF), polyacrylonitrile (PAN), polyethylene oxide (PEO), and the like can be used.

Whether the aqueous electrolyte contains water can be confirmed by GC-MS (Gas Chromatography-Mass Spectrometry). In addition, the salt concentration and water content in the aqueous electrolyte can be measured by, for example, ICP (Inductively Coupled Plasma) emission spectrometry. A predetermined amount of aqueous electrolyte is measured, and the concentrate of the contained salt is calculated, thereby calculating the mol concentration (mol/L). In addition, when the specific gravity of the aqueous electrolyte is measured, the number of moles in each of the solute and the solvent can be calculated.

5) Container

As the container that stores the positive electrode, the negative electrode, and the aqueous electrolyte, a metal container, a laminated film container, or a resin container can be used.

As the metal container, a metal can made of nickel, iron, stainless steel, or the like and having a rectangular shape or a cylindrical shape can be used. As the resin container, a container made of polyethylene, polypropylene, or the like can be used.

The board thickness of each of the resin container and the metal container preferably falls within the range of 0.05 mm to 1 mm. The board thickness is more preferably 0.5 mm or less, and much more preferably 0.3 mm or less.

As the laminated film, for example, a multilayered film formed by covering a metal layer with a resin layer can be used. Examples of the metal layer include a stainless steel foil, an aluminum foil, and an aluminum alloy foil. As the resin layer, a polymer such as polypropylene (PP), polyethylene (PE), nylon, or polyethylene terephthalate (PET) can be used. The thickness of the laminated film preferably falls within the range of 0.01 mm to 0.5 mm. The thickness of the laminated film is more preferably 0.2 mm or less.

6) Description of Details of Secondary Battery

The secondary battery according to this embodiment can be used in various forms such as a rectangular shape, a cylindrical shape, a flat type, a thin type, and a coin type. In addition, the secondary battery may be a secondary battery having a bipolar structure. The secondary battery having a bipolar structure is advantageous in producing a plurality of serial cells by one cell.

Details of the secondary battery according to the first embodiment will be described below with reference to FIGS. 3, 4, 5, 6, and 7.

FIG. 3 is a sectional view schematically showing another example of the secondary battery according to the first embodiment. FIG. 4 is a sectional view of the secondary battery shown in FIG. 3 taken along a line III-III.

An electrode group 1 is stored in a rectangular tubular metal container 2. The electrode group 1 has a structure formed by spirally winding a positive electrode 5 and a negative electrode 3 with a separator 4 interposing therebetween so as to form a flat shape. An aqueous electrolyte (not shown) is held by the electrode group 1. As shown in FIG. 3, a strip-shaped positive electrode side lead 22 is electrically connected to each of a plurality of portions at an end of the positive electrode 5 located on an end face of the electrode group 1. In addition, a strip-shaped negative electrode side lead 23 is electrically connected to each of a plurality of portions at an end of the negative electrode 3 located on the end face. The plurality of positive electrode side leads 22 are electrically connected to a positive electrode tab 16 in a bundled state. A positive electrode terminal is formed from the positive electrode side leads 22 and the positive electrode tab 16. In addition, the negative electrode side leads 23 are electrically connected to a negative electrode tab 17 in a bundled state. A negative electrode terminal is formed from the negative electrode side leads 23 and the negative electrode tab 17. A sealing plate 10 made of a metal is fixed to the opening portion of the metal container 2 by welding or the like. The positive electrode tab 16 and the negative electrode tab 17 are extracted to the outside from outlet holes provided in the sealing plate 10, respectively. The inner surface of each outlet hole of the sealing plate 10 is coated with an insulating member to avoid a short circuit caused by contact between the positive electrode tab 16 and the negative electrode tab 17.

As shown in FIG. 4, the other end of the negative electrode tab 17 has a strip shape and is electrically connected to each of a plurality of portions of the negative electrode 3 located on the upper end face of the electrode group 1. Although not illustrated, similarly, the other end of the positive electrode tab 16 has a strip shape and is electrically connected to each of a plurality of portions of the positive electrode 5 located on the upper end face of the electrode group 1.

Referring to FIG. 3, the sealing plate 10 made of a metal is fixed to the opening portion of the metal container 2 by welding or the like. The positive electrode side leads 22 and the negative electrode side leads 23 are extracted to the outside from outlet holes provided in the sealing plate 10, respectively. On the inner surfaces of the outlet holes of the sealing plate 10, positive electrode gaskets 18 and negative electrode gaskets 19 are arranged to avoid a short circuit caused by contact between the positive electrode side leads 22 and the negative electrode side leads 23. When the positive electrode gaskets 18 and the negative electrode gaskets 19 are arranged, the airtightness of the rectangular secondary battery 100 can be maintained.

A control valve 11 (safety valve) is arranged in the sealing plate 10. If the internal pressure of the battery cell is raised by a gas generated by electrolysis of the aqueous solvent, the generated gas can be released from the control valve 11 to the outside. As the control valve 11, for example, a return type valve that operates when the internal pressure exceeds a set value and functions as a sealing plug when the internal pressure lowers can be used. Alternatively, a non-return type valve that cannot recover the function as a sealing plug once it operates can be used. In FIG. 3, the control valve 11 is arranged at the center of the sealing plate 10. However, the position of the control valve 11 may be an end of the sealing plate 10. The control valve 11 may be omitted.

Additionally, a liquid pouring port 12 is provided in the sealing plate 10. The aqueous electrolyte can be poured via the liquid pouring port 12. The liquid pouring port 12 can be closed by a sealing plug 13 after the aqueous electrolyte is poured. The liquid pouring port 12 and the sealing plug 13 may be omitted.

Figure 6:
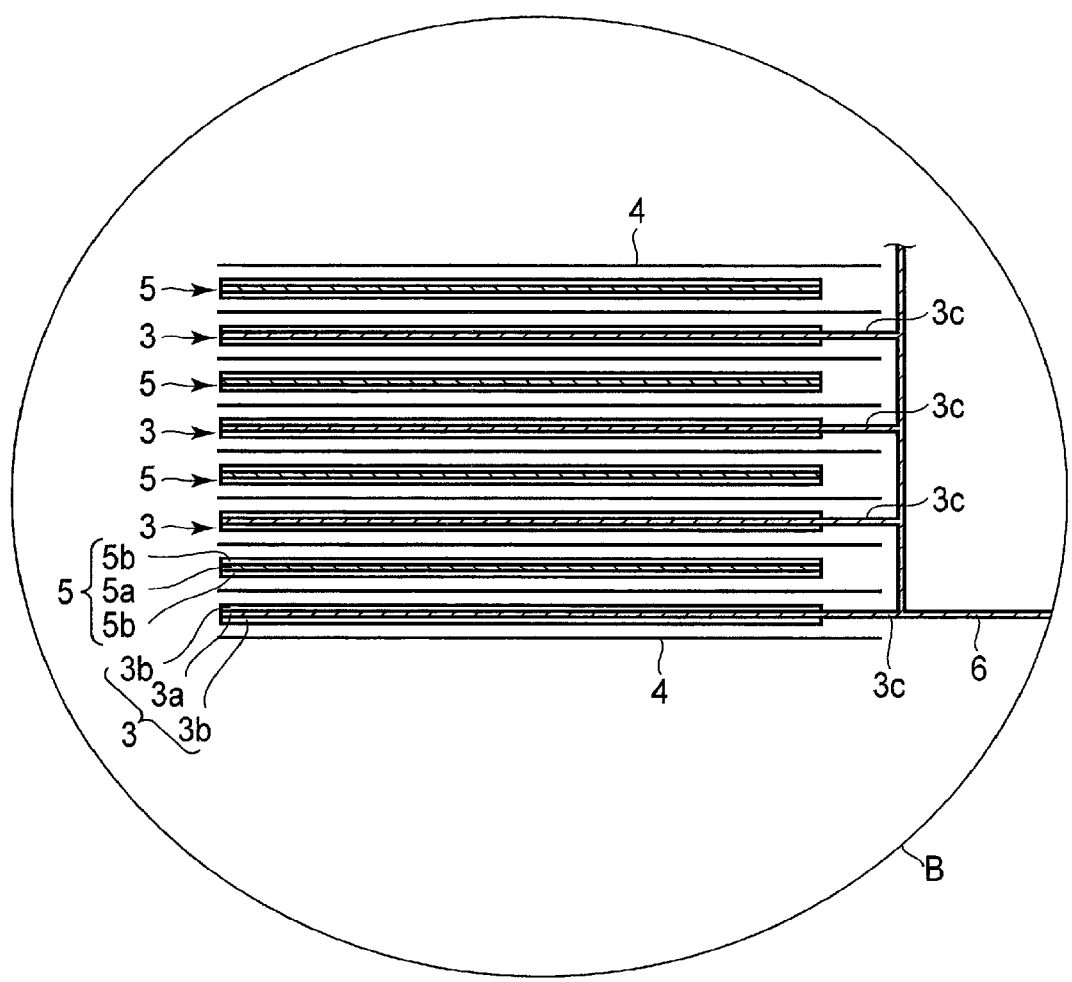
FIG. 6 is an enlarged cross-sectional view of section B of the secondary battery shown in FIG. 5.

FIG. 5 is a partially cut-out perspective view schematically showing another example of a secondary battery according to the first embodiment. FIG. 6 is an enlarged cross-sectional view of section B of the secondary battery shown in FIG. 5. FIG. 5 and FIG. 6 show an example of the secondary battery 100 used a laminated film container as a container.

The secondary battery 100 shown in FIGS. 5 and 6 includes an electrode group 1 shown in FIGS. 5 and 6, a container member 2 shown in FIG. 5, and an electrolyte, which is not shown. The electrode group 1 and the electrolyte are housed in the container member 2. The electrolyte is held in the electrode group 1.

The container member 2 is made of a laminate film including two resin layers and a metal layer sandwiched between the resin layers.

As shown in FIG. 6, the electrode group 1 is a stacked electrode group. The stacked electrode group 1 has a structure in which positive electrodes 3 and negative electrodes 5 are alternately stacked with separator(s) 4 sandwiched therebetween.

The electrode group 1 includes a plurality of the negative electrodes 3. Each of the negative electrodes 3 includes the negative electrode current collector 3a and the negative electrode active material-containing layers 3b supported on both surfaces of the negative electrode current collector 3a. The electrode group 1 further includes a plurality of the positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at its side a portion 3c where the negative electrode active material-containing layer 3b is not supported on any surface. This portion 3c serves as a negative electrode tab. As shown in FIG. 6, the portion 3c serving as the negative electrode tab does not overlap the positive electrode 5. A plurality of the negative electrode tabs (portions 3c) are electrically connected to the belt-like negative electrode terminal 6. A leading end of the belt-like negative electrode terminal 6 is drawn to the outside from a container member 2.

Although not shown, the positive electrode current collector 5a of each of the positive electrodes 5 includes at its side a portion where the positive electrode active material-containing layer 5b is not supported on any surface. This portion serves as a positive electrode tab. Like the negative electrode tab (portion 3 c), the positive electrode tab does not overlap the negative electrode 3. Further, the positive electrode tab is located on the opposite side of the electrode group 1 with respect to the negative electrode tab (portion 3c). The positive electrode tab is electrically connected to the belt-like positive electrode terminal 7. A leading end of the belt-like positive electrode terminal 7 is located on the opposite side of the negative electrode terminal 6 and drawn to the outside from the container member 2.

The secondary battery according to the first embodiment includes the above-described separator. The separator hardly passes the aqueous solvent and can be thinned. Hence, the secondary battery according to the first embodiment can implement a high energy density and high life characteristics.

Second Embodiment

According to a second embodiment, a battery module is provided. The battery module according to the second embodiment includes plural secondary batteries according to the first embodiment.

In the battery module according to the second embodiment, each of the single batteries may be arranged electrically connected in series, in parallel, or in a combination of in-series connection and in-parallel connection.

An example of the battery module according to the second embodiment will be described next with reference to the drawings.

FIG. 7 is a perspective view schematically showing an example of the battery module according to the second embodiment. A battery module 200 shown in FIG. 7 includes five single-batteries 100a to 100e, four bus bars 21, a positive electrode-side lead 22, and a negative electrode-side lead 23. Each of the five single-batteries 100a to 100e is a secondary battery according to the first embodiment.

Each bus bar 21 connects a negative electrode terminal 6 of one single-battery 100a and a positive electrode terminal 7 of the single-battery 100b positioned adjacent. The five single-batteries 100 are thus connected in series by the four bus bars 21. That is, the battery module 200 shown in FIG. 7 is a battery module of five in-series connection.

As shown in FIG. 7, the positive electrode terminal 7 of the single-battery 100a located at one end on the left among the row of the five single-batteries 100a to 100e is connected to the positive electrode-side lead 22 for external connection. In addition, the negative electrode terminal 6 of the single-battery 100e located at the other end on the right among the row of the five single-batteries 100a to 100e is connected to the negative electrode-side lead 23 for external connection.

The battery module according to the second embodiment includes the secondary battery according to the first embodiment. Hence, the battery module according to the second embodiment can implement a high energy density and high life characteristics.

Third Embodiment

According to a third embodiment, a battery pack is provided. The battery pack includes a battery module according to the second embodiment. The battery pack may include a single secondary battery according to the first embodiment, in place of the battery module according to the second embodiment.

The battery pack according to the third embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the third embodiment may further comprise an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the third embodiment will be described with reference to the drawings.

Figure 9:
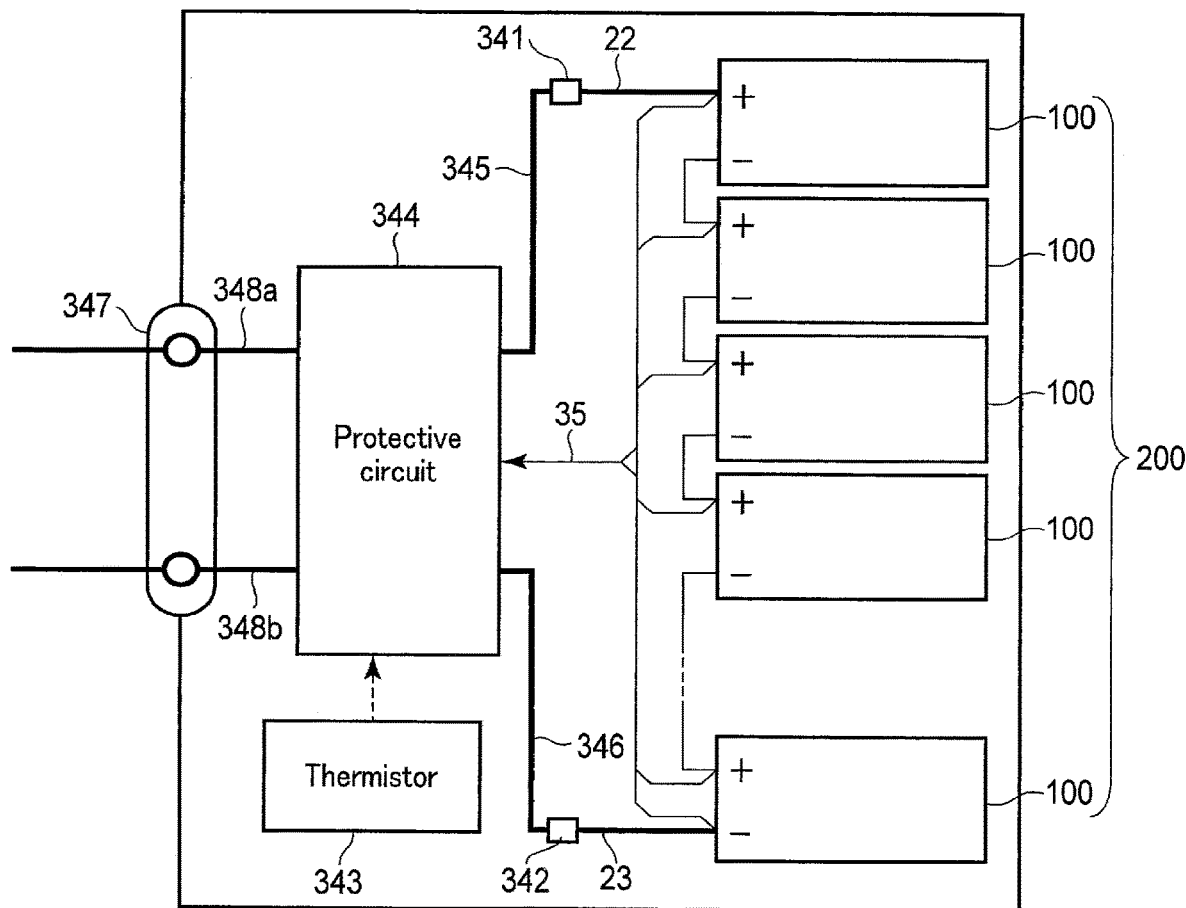
FIG. 9 is a block diagram showing an example of an electric circuit of the battery pack shown in FIG. 8.

FIG. 8 is an exploded perspective view schematically showing an example of the battery pack according to the third embodiment. FIG. 9 is a block diagram showing an example of an electric circuit of the battery pack shown in FIG. 8.

A battery pack 300 shown in FIGS. 8 and 9 includes a housing container 31, a lid 32, protective sheets 33, a battery module 200, a printed wiring board 34, wires 35, and an insulating plate (not shown).

The housing container 31 shown in FIG. 8 is a square bottomed container having a rectangular bottom surface. The housing container 31 is configured to be capable of storing the protective sheets 33, the battery module 200, the printed wiring board 34, and the wires 35. The lid 32 has a rectangular shape. The lid 32 covers the housing container 31 to store the battery module 200 and so on. The housing container 31 and the lid 32 are provided with openings, connection terminals, or the like (not shown) for connection to an external device or the like.

The battery module 200 includes plural single-batteries 100, a positive electrode-side lead 22, a negative electrode-side lead 23, and an adhesive tape 24.

At least one of the plural single-batteries 100 is a secondary battery according to the first embodiment. The plural single-batteries 100 are stacked such that the negative electrode terminals 6 and the positive electrode terminals 7, which extend outside, are directed toward the same direction. The plural single-batteries 100 are electrically connected in series, as shown in FIG. 9. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape 24 fastens the plural single-batteries 100. The plural single-batteries 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural single-batteries 100.

One end of the positive electrode-side lead 22 is connected to the positive electrode terminal 7 of the single-battery 100 located lowermost in the stack of the single-batteries 100. One end of the negative electrode-side lead 23 is connected to the negative electrode terminal 6 of the single-battery 100 located uppermost in the stack of the single-batteries 100.

A printed wiring board 34 is disposed on the one inner surface along the short-side direction of inner surfaces of the housing container 31. The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One main surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through-hole. By inserting the other end of the positive electrode-side lead 22 into the though-hole, the positive electrode-side connector 341 and the positive electrode-side lead 22 become electrically connected. The negative electrode-side connector 342 is provided with a through-hole. By inserting the other end of the negative electrode-side lead 23 into the though-hole, the negative electrode-side connector 342 and the negative electrode-side lead 23 become electrically connected.

The thermistor 343 is fixed to one main surface of the printed wiring board 34. The thermistor 343 detects the temperature of each single-battery 100 and transmits detection signals to the protective circuit 344.

The external power distribution terminal 347 is fixed to the other main surface of the printed wiring board 34. The external power distribution terminal 347 is electrically connected to device(s) that exists outside the battery pack 300.

The protective circuit 344 is fixed to the other main surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural single-batteries 100 via the wires 35.

The protective sheets 33 are arranged on both inner surfaces of the housing container 31 along the long-side direction and on the inner surface along the short-side direction, facing the printed wiring board 34 across the battery module 200 positioned therebetween. The protective sheets 33 are made of, for example, resin or rubber.

The protective circuit 344 controls charge and discharge of the plural single-batteries 100. The protective circuit 344 is also configured to cut-off electric connection between the protective circuit 344 and the external power distribution terminal 347 to external devices, based on detection signals transmitted from the thermistor 343 or detection signals transmitted from each single-battery 100 or the battery module 200.

An example of the detection signal transmitted from the thermistor 343 is a signal indicating that the temperature of the single-battery (single-batteries) 100 is detected to be a predetermined temperature or more. An example of the detection signal transmitted from each single-battery 100 or the battery module 200 is a signal indicating detection of over-charge, over-discharge, and overcurrent of the single-battery (single-batteries) 100. When detecting over-charge or the like for each of the single batteries 100, the battery voltage may be detected, or a positive electrode potential or negative electrode potential may be detected. In the latter case, a lithium electrode to be used as a reference electrode may be inserted into each single battery 100.

Note that, as the protective circuit 344, a circuit included in a device (for example, an electronic device or an automobile) that uses the battery pack 300 as a power source may be used.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

Such a battery pack is used, for example, in applications where excellent cycle performance is demanded when a large current is extracted. More specifically, the battery pack is used as, for example, a power source for electronic devices, a stationary battery, or an onboard battery for vehicles. An example of the electronic device is a digital camera. The battery pack 300 is particularly favorably used as an onboard battery.

The battery pack according to the third embodiment includes the secondary battery according to the first embodiment or the battery module according to the second embodiment. Hence, the battery pack according to the third embodiment has a high energy density and is excellent in safety.

Fourth Embodiment

According to a fourth embodiment, a vehicle is provided. The battery pack according to the third embodiment is installed on this vehicle.

In the vehicle according to the fourth embodiment, the battery pack is configured, for example, to recover regenerative energy from motive force of the vehicle. The vehicle according to the fourth embodiment can include a mechanism configured to convert kinetic energy of the vehicle into regenerative energy.

Examples of the vehicle according to the fourth embodiment include two- to four-wheeled hybrid electric automobiles, two- to four-wheeled electric automobiles, electric assist bicycles, and railway cars.

In the vehicle according to the fourth embodiment, the installing position of the battery pack is not particularly limited. For example, the battery pack may be installed in the engine compartment of the vehicle, in rear parts of the vehicle, or under seats.

The vehicle according to the fourth embodiment may be equipped with a plurality of battery packs. In this case, the battery packs may be electrically connected in series, may be electrically connected in parallel, or may be electrically connected in a combination of series connection and parallel connection.

An example of the vehicle according to the fourth embodiment is explained below, with reference to the drawings.

Figure 10:
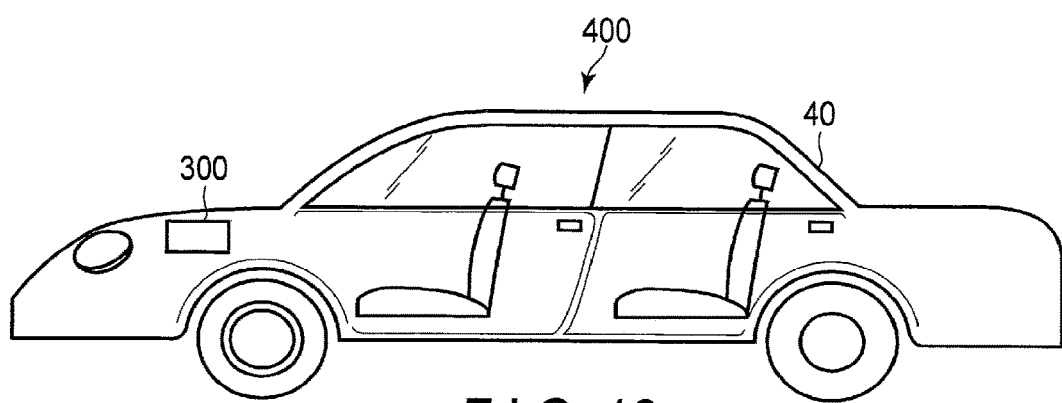
FIG. 10 is a cross-sectional view schematically showing an example of a vehicle according to the fourth embodiment; and, FIG. 11 is a block diagram showing an example of a system including a stationary power supply according to the fifth embodiment.

FIG. 10 is a cross-sectional view schematically showing an example of a vehicle according to the fourth embodiment.

A vehicle 400, shown in FIG. 10 includes a vehicle body 40 and a battery pack 300 according to the fourth embodiment. In FIG. 10, the vehicle 400 is a four-wheeled automobile.

This vehicle 400 may have plural battery packs 300 installed. In such a case, the battery packs 300 may be connected in series, connected in parallel, or connected in a combination of in-series connection and in-parallel connection.

An example is shown in FIG. 10, where the battery pack 300 is installed in an engine compartment located at the front of the vehicle body 40. As described above, the battery pack 300 may be installed, for example, in rear sections of the vehicle body 40, or under a seat. The battery pack 300 may be used as a power source of the vehicle 400. The battery pack 300 can also recover regenerative energy of power of the vehicle 400.

The vehicle according to the fourth embodiment includes the battery pack according to the third embodiment. Hence, the vehicle according to the fourth embodiment can implement a long life.

Fifth Embodiment

According to a fifth embodiment, a stationary power supply is provided. The stationary power supply includes a battery pack according to the third embodiment. Note that instead of a battery pack according to the third embodiment, the stationary power supply may have a battery module according to the second embodiment or a secondary battery according to the first embodiment installed therein.

The stationary power supply according to the fifth embodiment includes a battery pack according to the third embodiment. Therefore, the stationary power supply according to the fifth embodiment can implement a long life.

FIG. 11 is a block diagram showing an example of a system including a stationary power supply according to the fifth embodiment. FIG. 11 is a diagram showing an application example to stationary power supplies 112, 123 as an example of use of battery packs 300A, 300B according to the third embodiment. In the example shown in FIG. 11, a system 110 in which the stationary power supplies 112, 123 are used is shown. The system 110 includes an electric power plant 111, the stationary power supply 112, customer side electric power system 113, and an energy management system (EMS) 115. Also, an electric power network 116 and a communication network 117 are formed in the system 110, and the electric power plant 111, the stationary power supply 112, the customer side electric power system 113 and the EMS 115 are connected via the electric power network 116 and the communication network 117. The EMS 115 performs control to stabilize the entire system 110 by utilizing the electric power network 116 and the communication network 117.

The electric power plant 111 generates a large amount of electric power from fuel sources such as thermal power or nuclear power. Electric power is supplied from the electric power plant 111 through the electric power network 116 and the like. In addition, the battery pack 300A is installed in the stationary power supply 112. The battery pack 300A can store electric power and the like supplied from the electric power plant 111. In addition, the stationary power supply 112 can supply the electric power stored in the battery pack 300A through the electric power network 116 and the like. The system 110 is provided with an electric power converter 118. The electric power converter 118 includes a converter, an inverter, a transformer and the like. Thus, the electric power converter 118 can perform conversion between direct current (DC) and alternate current (AC), conversion between alternate currents of frequencies different from each other, voltage transformation (step-up and step-down) and the like. Therefore, the electric power converter 118 can convert electric power from the electric power plant 111 into electric power that can be stored in the battery pack 300A.

The customer side electric power system 113 includes an electric power system for factories, an electric power system for buildings, an electric power system for home use and the like. The customer side electric power system 113 includes a customer side EMS 121, an electric power converter 122, and the stationary power supply 123. The battery pack 300B is installed in the stationary power supply 123. The customer side EMS 121 performs control to stabilize the customer side electric power system 113.

Electric power from the electric power plant 111 and electric power from the battery pack 300A are supplied to the customer side electric power system 113 through the electric power network 116. The battery pack 300B can store electric power supplied to the customer side electric power system 113. Similarly to the electric power converter 118, the electric power converter 122 includes a converter, an inverter, a transformer and the like. Thus, the electric power converter 122 can perform conversion between direct current and alternate current, conversion between alternate currents of frequencies different from each other, voltage transformation (step-up and step-down) and the like. Therefore, the electric power converter 122 can convert electric power supplied to the customer side electric power system 113 into electric power that can be stored in the battery pack 300B.

Note that the electric power stored in the battery pack 300B can be used, for example, for charging a vehicle such as an electric vehicle. Also, the system 110 may be provided with a natural energy source. In such a case, the natural energy source generates electric power by natural energy such as wind power and solar light. In addition to the electric power plant 111, electric power is also supplied from the natural energy source through the electric power network 116.

EXAMPLES

Examples will be described below. The embodiments are not limited to the following examples.

Example 1

<Production of Positive Electrode>

A positive electrode was produced in the following way.

First, a positive electrode active material, a conductive agent, and a binder were dispersed in a N-methyl-2-pyrrolidone (NMP) solvent to prepare a slurry. The ratios of the positive electrode active material, the conductive agent, and the binder were 80 mass %, 10 mass %, and 10 mass %, respectively. As the positive electrode active material, a lithium manganese composite oxide ($LiMn_2O_4$) having a spinel structure and an average particle size of 10 μm was used. The lithium ion insertion/extraction potential of the lithium manganese composite oxide was 3.5 V (vs. Li/Li$^+$) to 4.2 V (vs. Li/Li$^+$). As the conductive agent, a graphite powder was used. As the binder, polyacrylimide (PAI) was used.

Next, the prepared slurry was applied to both surfaces of a positive electrode current collector, and the coatings were dried, thereby forming a positive electrode active material-containing layer. As the positive electrode current collector, a Ti foil having a thickness of 12 μm was used. Next, the positive electrode current collector and the positive electrode active material-containing layer were pressed to prepare a positive electrode. The density of the positive electrode active material-containing layer was 3.0 g/cm$^3$.

<Production of Negative Electrode>

A negative electrode was produced in the following way.

First, a negative electrode active material, a conductive agent, and a binder were dispersed in an NMP solvent to prepare a slurry. As the negative electrode active material, a lithium titanium oxide ($Li_4Ti_5O_{12}$) powder having an average secondary particle size (diameter) of 15 μm was used. The lithium ion insertion/extraction potential of the lithium titanium oxide was 1.5 V (vs. Li/Li$^+$) to 1.7 V (vs. Li/Li$^+$). As the conductive agent, a graphite powder was used. As the binder, PAI was used. The ratios of the negative electrode active material, the conductive agent, and the binder were 80 mass %, 10 mass %, and 10 mass %, respectively.

Next, the obtained slurry was applied to a negative electrode current collector, and the coating was dried, thereby forming a negative electrode active material-containing layer. As the negative electrode current collector, a Ti foil having a thickness of 50 μm was used. Here, when applying the slurry to the Ti foil, for a portion located in the outermost periphery of the electrode group in the negative electrode to be produced, the slurry was applied to only one surface of the Ti foil. For the remaining portions, the slurry was applied to both surfaces of the Ti foil. Next, the negative electrode current collector and the negative electrode active material-containing layer were pressed to obtain a negative electrode. The density of the negative electrode active material containing layer was 2.0 g/cm$^3$.

<Production of Separator>

Glass solid electrolyte LATP ($Li_{1.5}Al_{0.5}Ti_{1.5}(PO_4)_3$) particles, a polyvinyl formal resin, lithium bis(trifluoromethanesulfonyl)imide (LiTFSI), and ethanol were mixed to obtain a solution mixture. The average particle size of the LATP particles was 1.0 μm. The weight-average molecular weight of the polyvinyl formal resin was about 100,000. Note that the water absorption of the polyvinyl formal resin obtained by the above-described method was 3%. The mass ratio of the LATP particles, the polyvinyl formal resin, and LiTFSI was 9:1:1. The solid content concentration in the solution mixture was 40 mass %.

Next, the solution mixture was mixed by a ball mill for 24 hrs, thereby obtaining a slurry. Next, the slurry was applied on one main surface of a cellulose nonwoven fabric having a thickness of 15 μm by a doctor blade method, and the resulting coating was dried to obtain a separator. The thickness of the solid electrolyte layer formed on the nonwoven fabric was about 20 μm. The ratio of the LATP particles in the solid electrolyte layer was 91 mass %, the ratio of the polyvinyl formal resin was 8.0 mass %, and the ratio of the LiTFSI was 1.0 mass %. The separator will be referred to as a separator SP1 hereinafter. Note that a plurality of the separators SP1 were produced.

<Production of Electrode Group>

The positive electrode, the first separator SP1, the negative electrode, and the second separator SP1 were laminated in this order to obtain a laminated body. At this time, the porous self-supporting film was stacked so as to face the negative electrode via the solid electrolyte layer. Next, the laminated body was spirally wound such that the negative electrode was located in the outermost periphery, thereby producing an electrode group. The electrode group was hot-pressed at 90° C. to produce a flat electrode group. The obtained electrode group was stored in a thin metal can made of stainless steel having a thickness of 0.25 mm. Note that as the metal can, a can in which a valve configured to leak a gas when the internal pressure became 2 atm or more was placed was used.

<Preparation of Aqueous Electrolyte>

Lithium chloride (LiCl) and lithium sulfate ($Li_2SO_4$) were dissolved in water to obtain a liquid aqueous electrolyte. In the aqueous electrolyte, the mol concentration of LiCl was 3 mol/L, and the mol concentration of $Li_2SO_4$ was 0.25 mol/L.

<Production of Secondary Battery and initial Charge and Discharge>

The liquid aqueous electrolyte was poured into the above-described metal can container storing the electrode group, thereby producing a secondary battery. Next, the secondary battery was left stand under a 25° C. environment for 24 hrs. After that, the secondary battery was submitted for initial charge and discharge under a 25° C. environment. In the initial charge and discharge, first, constant current charge was performed by a current of 5 A until the voltage of the secondary battery reached 2.8 V. Next, constant current discharge was performed by a current of 1 A until the voltage reached 2.1 V. Additionally, in the initial charge and discharge, the capacity of the secondary battery was confirmed.

Example 2

A separator was formed by a method similar to the method described in Example 1 except that the solid content concentration in a solution mixture was changed from 40 mass % to 30 mass %. The thickness of the solid electrolyte layer in this separator was about 18 μm. As a result of TG analysis of the solid electrolyte layer, the ratio of the LATP particles in the solid electrolyte layer was 91.8 mass %, the ratio of the polyvinyl formal resin was 7.3 mass %, and the ratio of the LiTFSI was 0.9 mass %. The separator will be referred to as a separator SP2 hereinafter.

A secondary battery was obtained by a method similar to the method described in Example 1 except that the separator SP2 was used in place of the separator SP1.

Example 3

A separator was formed by a method similar to the method described in Example 1 except that LiTFSI was omitted. The thickness of the solid electrolyte layer in this separator was about 20 μm. As a result of TG analysis of the solid electrolyte layer, the ratio of the LATP particles in the solid electrolyte layer was 91.0 mass %, and the ratio of the polyvinyl formal resin was 9.0 mass %. The separator will be referred to as a separator SP3 hereinafter.

A secondary battery was obtained by the method similar to the method described in Example 1 except that the separator SP3 was used in place of the separator SP1.

Example 4

A separator was formed by a method similar to the method described in Example 1 except that LLZ($Li_7La_3Zr_2O_{12}$) particles were used in place of the LATP particles. The average particle size of the LLZ particles was 1.5 μm. The separator will be referred to as a separator SP4 hereinafter.

A secondary battery was obtained by a method similar to the method described in Example 1 except that the separator SP4 was used in place of the separator SP1.

Example 5

A separator was formed by a method similar to the method described in Example 1 except that the solid content concentration in a solution mixture was changed from 40 mass % to 20 mass %. The thickness of the solid electrolyte layer in this separator was about 19 μm. As a result of TG analysis of the solid electrolyte layer, the ratio of the LATP particles in the solid electrolyte layer was 95.5 mass %, the ratio of the polyvinyl formal resin was 4.1 mass %, and the ratio of the LiTFSI was 0.4 mass %. The separator will be referred to as a separator SP5 hereinafter.

A secondary battery was obtained by the method similar to the method described in Example 1 except that the separator SP5 was used in place of the separator SP1.

Comparative Example 1

A secondary battery was obtained by a method similar to the method described in Example 1 except that a nonwoven fabric NF1 made of cellulose was used in place of the separator SP1. Note that the thickness of the nonwoven fabric NF1 made of cellulose was 20 μm.

Comparative Example 2

First, a slurry containing solid electrolyte particles, a polymeric material, and an electrolyte salt was obtained by a method similar to the method described in Example 1. Next, a cellulose nonwoven fabric was immersed in the slurry, then pulled up from the slurry, and dried in a drying container at 120° C. Next, the dried cellulose nonwoven fabric was pressed at a pressing pressure of 2.0 kN to obtain a separator. The separator will be referred to as a separator SP6 hereinafter.

As a result of observing the separator SP6, the solid electrolyte layers were provided on both main surfaces of the nonwoven fabric. The thickness of each solid electrolyte layer was about 10 μm. As a result of TG analysis of the solid electrolyte layer, the ratio of the LATP particles in the solid electrolyte layer was 90 mass %, the ratio of the polyvinyl formal resin was 9.0 mass %, and the ratio of the LiTFSI was 1.0 mass %.

A secondary battery was obtained by a method similar to the method described in Example 1 except that the separator SP6 was used in place of the separator SP1.

Comparative Example 3

First, a slurry containing solid electrolyte particles, a polymeric material, and an electrolyte salt was obtained by a method similar to the method described in Example 1. Next, the slurry was formed into a film on a fluororesin-impregnated glass cloth by a doctor blade method to obtain a laminated body of the glass cloth and a solid electrolyte film. The thickness of the solid electrolyte film was about 20 μm. As a result of TG analysis of the solid electrolyte film, the ratio of the LATP particles in the solid electrolyte film was 90 mass %, the ratio of the polyvinyl formal resin was 9.0 mass %, and the ratio of the LiTFSI was 1.0 mass %.

Next, a main surface of the solid electrolyte film and a main surface of a cellulose nonwoven fabric having a thickness of 15 μm were superposed and press-bonded at a temperature of 120° C. Next, the fluororesin-impregnated glass cloth was peeled off from the laminated body to obtain a separator. The separator will be referred to as a separator SP7 hereinafter.

A secondary battery was obtained by a method similar to the method described in Example 1 except that the separator SP7 was used in place of the separator SP1.

Example 6

A separator was formed by a method similar to the method described in Example 1 except that a polyvinyl butyral resin was used in place of the polyvinyl formal resin. The weight-average molecular weight of the polyvinyl butyral resin was about 70,000. The separator will be referred to as a separator SP8 hereinafter.

A secondary battery was obtained by a method similar to the method described in Example 1 except that the separator SP8 was used in place of the separator SP1.

Example 7

A separator was formed by a method similar to the method described in Example 1 except that a polyvinylidene fluoride resin was used in place of the polyvinyl formal resin. The weight-average molecular weight of the polyvinylidene fluoride resin was about 170,000. The separator will be referred to as a separator SP9 hereinafter.

A secondary battery was obtained by a method similar to the method described in Example 1 except that the separator SP9 was used in place of the separator SP1.

Example 8

A secondary battery was obtained by a method similar to the method described in Example 1 except that a lithium cobaltate ($LiCoO_2$) was used as a positive electrode active material in place of the lithium manganese oxide ($LiMn_2O_4$). The lithium ion insertion/extraction potential of the lithium cobaltate was 3.5 V (vs. $Li/Li^+$) to 4.0 V (vs. $Li/Li^+$).

Example 9

A separator was formed by a method similar to the method described in Example 1 except that lithium bis(fluorosulfonyl)imide (LiFSI) was used in place of LiTFSI. The separator will be referred to as a separator SP10 hereinafter.

A secondary battery was obtained by a method similar to the method described in Example 1 except that the separator SP10 was used in place of the separator SP1.

Example 10

A secondary battery was obtained by a method similar to the method described in Example 1 except that a sodium-containing niobium titanium composite oxide LNT ($Li_2Na_{1.5}Ti_{5.5}Nb_{0.5}O_{14}$) was used as a negative electrode active material in place of the lithium titanium oxide ($Li_4Ti_5O_{12}$). The lithium ion insertion/extraction potential of the sodium niobium titanium composite oxide was 1.0 V (vs. $Li/Li^+$) to 1.3 V (vs. $Li/Li^+$).

Comparative Example 4

First, a polyvinylidene fluoride resin having a weight-average molecular weight of 170,000 was dissolved in an organic solvent to prepare a solution. Next, the solution was applied on one surface of a cellulose nonwoven fabric, and the resulting coating was dried to form a PVdF resin film. Next, a separator was formed by a method similar to the method described in Comparative Example 3 except that a cellulose nonwoven fabric having the PVdF resin film formed thereon was used in place of the cellulose nonwoven fabric, and the cellulose nonwoven fabric and a solid electrolyte film were stacked such that the PVdF resin film and the solid electrolyte film were in contact with each other. The separator will be referred to as a separator SP11 hereinafter.

A secondary battery was obtained by a method similar to the method described in Example 1 except that the separator SP11 was used in place of the separator SP1.

<Evaluation Method>

(Microscopic ATR Method)

For each of the separators SP1 to SP5 and SP7 to SP11, it was confirmed by the microscopic ATR method whether or not a polymeric material was contained on a main surface of a cellulose nonwoven fabric having no solid electrolyte layer. The results are shown in Table 1.

(Water-Shielding Test)

For each of the separators SP1 to SP11, a water-shielding test was conducted by a method similar to the method described above. The reference value was 0 μS/cm. The result is shown in Table 1.

(Bending Test and Water-Shielding Test)

For each of the separators SP1 to SP11, a bending test was conducted by a method similar to the method described above. Next, for each test piece after the bending test, the water-shielding test was conducted by a method similar to the method described above. The result is shown in Table 1.

(Charge-and-Discharge Efficiency Measurement)

The charge-and-discharge efficiency was measured for each of the secondary batteries obtained in the examples and the comparative examples. More specifically, under a 25° C. environment, each secondary battery was charged by a constant current of 5 A until the battery voltage reached 2.8 V. Next, the state was maintained for 30 min. Next, the secondary battery was discharged by a constant current of 5 A until the battery voltage reached 2.1 V. Next, the state was maintained for 30 min. The series of operations was defined as one charge-and-discharge cycle and repeated 50 times. Next, the discharge capacity and charge capacity of the secondary battery after the 50 cycles were measured, and the charge-and-discharge efficiency (discharge capacity/charge capacity) was calculated. The result is shown in Table 2.

Table 1 summarizes data concerning the separators according to Examples and Comparative Examples.

TABLE 1

| | Separator | | | | | | | | | Water-shielding test | |
|---|---|---|---|---|---|---|---|---|---|---|---|
| | Solid electrolyte layer | | | | | | | | | | |
| | Solid electrolyte | | Polymeric material | | Electrolyte salt | | Film thickness (μm) | Microscopic ATR | Film thickness (μm) | Pre-test electric conductivity (μS/cm) | Post-test electric conductivity (μS/cm) |
| | Type | Ratio (%) | Type | Ratio (%) | Type | Ratio (%) | | | | | |
| Example 1 | LATP | 91.0 | Polyvinyl formal | 8.0 | LiTFSi | 1.0 | 20 | Present | 35 | 10 | 10 |
| Example 2 | LATP | 91.8 | Polyvinyl formal | 7.3 | LiTFSi | 0.9 | 18 | Present | 33 | 15 | 38 |
| Example 3 | LATP | 91.0 | Polyvinyl formal | 9.0 | none | 0.0 | 20 | Present | 35 | 16 | 22 |

TABLE 1-continued

| | Separator | | | | | | | | | |
|---|---|---|---|---|---|---|---|---|---|---|
| | Solid electrolyte layer | | | | | | | | Water-shielding test | |
| | Solid electrolyte | | Polymeric material | | Electrolyte salt | | Film thickness (μm) | Microscopic ATR | Film thickness (μm) | Pre-test electric conductivity (μS/cm) | Post-test electric conductivity (μS/cm) |
| | Type | Ratio (%) | Type | Ratio (%) | Type | Ratio (%) | | | | | |
| Example 4 | LLZ | 91.0 | Polyvinyl formal | 8.0 | LiTFSi | 1.0 | 20 | Present | 35 | 5 | 9 |
| Example 5 | LATP | 95.5 | Polyvinyl formal | 4.1 | LiTFSi | 0.4 | 19 | Present | 34 | 150 | >1000 |
| Comparative Example 1 | — | | — | | — | | — | — | 20 | — | — |
| Comparative Example 2 | LATP | 90.0 | Polyvinyl formal | 9.0 | LiTFSi | 1.0 | 10/10 | — | 35 | 10 | 10 |
| Comparative Example 3 | LATP | 90.0 | Polyvinyl formal | 9.0 | LiTFSi | 1.0 | 20 | Absent | 35 | 10 | 10 |
| Example 6 | LATP | 91.0 | Polyvinyl butyral | 8.0 | LiTFSi | 1.0 | 20 | Present | 35 | 11 | 15 |
| Example 7 | LATP | 91.0 | PVdF | 8.0 | LiTFSi | 1.0 | 20 | Present | 35 | 20 | 31 |
| Example 8 | LATP | 91.0 | Polyvinyl formal | 8.0 | LiTFSi | 1.0 | 20 | Present | 35 | 10 | 10 |
| Example 9 | LATP | 91.0 | Polyvinyl formal | 8.0 | LiFSi | 1.0 | 20 | Present | 35 | 12 | 13 |
| Example 10 | LATP | 91.0 | Polyvinyl formal | 8.0 | LiTFSi | 1.0 | 20 | Present | 35 | 10 | 10 |
| Comparative Example 4 | LATP | 91.0 | Polyvinyl formal/PVdF coat | 8.0 | LiTFSi | 1.0 | 20 | Absent | 35 | 5 | 7 |

Referring to Table 1, of columns under the heading "separator", in a column lower than a column with a notation "solid electrolyte" lower than the heading "solid electrolyte layer", a column with a notation "type" describes the type of each compound used as the solid electrolyte particles. A column with a notation "ratio (%)" describes the ratio of the solid electrolyte particles in the solid electrolyte layer. In a column lower than a column with a notation "polymeric material", a column with a notation "type" describes the type of the polymeric material contained in the solid electrolyte layer. A column with a notation "ratio (%)" describes the ratio of the polymeric material in the solid electrolyte layer. In a column lower than a column with a notation "electrolyte salt", a column with a notation "type" describes the type of the electrolyte salt contained in the solid electrolyte layer. A column with a notation "ratio (%)" describes the ratio of the electrolyte salt in the solid electrolyte layer. A column with a notation "film thickness (μm)" describes the thickness of the solid electrolyte layer.

Of columns under the heading "separator", a column with a notation "microscopic ATR" describes whether or not a polymeric material existed on a main surface of a nonwoven fabric having no solid electrolyte layer. A column with a notation "thickness (μm)" describes the thickness of the separator. Of columns under the heading "water-shielding test", a column with a notation "pre-test electric conductivity (μS/cm)" describes the results of the water-shielding test of the separator before conducting the bending test. A column with a notation "post-test electric conductivity (μS/cm)" describes the results of the water-shielding test of the separator after conducting the bending test.

Table 2 summarizes data concerning the batteries according to Examples and Comparative Examples.

TABLE 2

| | Battery | | | | |
|---|---|---|---|---|---|
| | Positive electrode Positive electrode active material | Negative electrode Negative electrode active material | Aqueous electrolyte Electrolyte salt | Battery characteristic | |
| | | | | Charge-and-discharge efficiency (%) | Discharge capacity (mAh/g) |
| Example 1 | LiMn$_2$O$_4$ | L$_4$T$_5$O$_{12}$ | 3M LiCl 0.25M Li$_2$SO$_4$ | 92 | 161 |
| Example 2 | LiMn$_2$O$_4$ | L$_4$T$_5$O$_{12}$ | 3M LiCl 0.25M Li$_2$SO$_4$ | 84 | 165 |
| Example 3 | LiMn$_2$O$_4$ | L$_4$T$_5$O$_{12}$ | 3M LiCl 0.25M Li$_2$SO$_4$ | 80 | 164 |
| Example 4 | LiMn$_2$O$_4$ | L$_4$T$_5$O$_{12}$ | 3M LiCl 0.25M Li$_2$SO$_4$ | 85 | 166 |
| Example 5 | LiMn$_2$O$_4$ | L$_4$T$_5$O$_{12}$ | 3M LiCl 0.25M Li$_2$SO$_4$ | 70 | 161 |
| Comparative Example 1 | LiMn$_2$O$_4$ | L$_4$T$_5$O$_{12}$ | 3M LiCl 0.25M Li$_2$SO$_4$ | 54 | 162 |
| Comparative Example 2 | LiMn$_2$O$_4$ | L$_4$T$_5$O$_{12}$ | 3M LiCl 0.25M Li$_2$SO$_4$ | 23 | 21 |
| Comparative Example 3 | LiMn$_2$O$_4$ | L$_4$T$_5$O$_{12}$ | 3M LiCl 0.25M Li$_2$SO$_4$ | 71 | 88 |
| Example 6 | LiMn$_2$O$_4$ | L$_4$T$_5$O$_{12}$ | 3M LiCl 0.25M Li$_2$SO$_4$ | 90 | 162 |
| Example 7 | LiMn$_2$O$_4$ | L$_4$T$_5$O$_{12}$ | 3M LiCl 0.25M Li$_2$SO$_4$ | 81 | 152 |

TABLE 2-continued

| | Battery | | | | |
|---|---|---|---|---|---|
| | Positive electrode | Negative electrode | | Battery characteristic | |
| | Positive electrode active material | Negative electrode active material | Aqueous electrolyte Electrolyte salt | Charge-and-discharge efficiency (%) | Discharge capacity (mAh/g) |
| Example 8 | LiCoO$_2$ | L$_4$T$_5$O$_{12}$ | 3M LiCl 0.25M Li$_2$SO$_4$ | 88 | 141 |
| Example 9 | LiMn$_2$O$_4$ | L$_4$T$_5$O$_{12}$ | 3M LiCl 0.25M Li$_2$SO$_4$ | 88 | 165 |
| Example 10 | LiMn$_2$O$_4$ | LNT | 3M LiCl 0.25M Li$_2$SO$_4$ | 90 | 178 |
| Comparative Example 4 | LiMn$_2$O$_4$ | L$_4$T$_5$O$_{12}$ | 3M LiCl 0.25M Li$_2$SO$_4$ | 68 | 77 |

Referring to Table 2, of columns under the heading "battery", a column with a notation "positive electrode active material" lower than the heading "positive electrode" describes the type of each positive electrode active material. A column with a notation "negative electrode active material" lower than the heading "negative electrode" describes the type of each negative electrode active material. Of columns lower than the heading "aqueous electrolyte", a column with a notation "electrolyte salt" describes the type and mol concentration of each electrolyte salt.

Furthermore, of columns under the heading "battery characteristic", a column with a notation "charge-and-discharge efficiency (%)" describes a value obtained by dividing the discharge capacity after the 50-cycle test by the charge capacity. A column with a notation "discharge capacity (mAh/g)" describes the discharge capacity after the 50-cycle test.

As shown in Table 1, in the secondary batteries according to Examples 1 to 10 using the separator in which the solid electrolyte layer was provided on one of the main surfaces of the porous self-supporting film and the porous self-supporting film and the solid electrolyte layer were adhered with the same polymeric material as the polymeric material contained in the solid electrolyte layer, high charge-and-discharge efficiency and high discharge capacity in the charge-and-discharge cycle were implemented.

On the other hand, in the secondary battery according to Comparative Example 1 in which the cellulose nonwoven fabric was used for the separator, although the discharge capacity was high, the charge-and-discharge efficiency was low. This may be because water decomposition was not suppressed on the negative electrode side. In the secondary battery according to Comparative Example 2 using the separator in which the solid electrolyte layers were provided on both the main surfaces of the porous self-supporting film by a dipping method, both the charge-and-discharge efficiency and the discharge capacity were low. This may be because the electrolyte impregnating property of the porous self-supporting film decreases and the internal resistance increases. In the secondary batteries according to Comparative Examples 3 and 4 using the separator in which the solid electrolyte layer was heated and adhered onto the porous self-supporting film by a hot-melt method, although the charge-and-discharge efficiency was high, the discharge capacity was low. This may be because an insulating layer formed of a binder contained in the solid electrolyte layer was provided at an interface between the solid electrolyte layer and the porous self-supporting film by the hot-melt method.

As is apparent from Table 1, in the secondary batteries according to Examples 1 to 4 and 6 to 10 using the separator having a concentration of the polymeric material contained in the solid electrolyte layer of 5 mass % or more, the charge-and-discharge efficiency in the charge-and-discharge cycle was more excellent than the charge-and-discharge efficiency of the secondary battery according to Example 5 using the separator having a concentration of the polymeric material contained in the solid electrolyte layer of less than 5 mass %.

Additionally, as is apparent from Table 1, in the secondary battery according to Example 1 using the separator including the solid electrolyte layer containing an electrolyte salt, the charge-and-discharge efficiency in the charge-and-discharge cycle is more excellent than the charge-and-discharge efficiency of the secondary battery according to Example 3 using the separator including the solid electrolyte layer containing no electrolyte salt.

As can be seen from the results of Examples 1, 6, and 7, excellent performances can be obtained even if the type of the polymeric material contained in the solid electrolyte layer is changed. As can be seen from the results of Examples 1 and 9, excellent performances can be obtained even if the type of the electrolyte salt contained in the solid electrolyte layer is changed. As can be seen from the results of Examples 1 and 8, excellent performances can be obtained even if the type of the positive electrode active material is changed. As can be seen from the results of Examples 1 and 10, excellent performances can be obtained even if the type of the negative electrode active material is changed.

A secondary battery according to at least one of the above-described embodiments includes a positive electrode, a negative electrode, a separator, and an aqueous electrolyte. The separator includes a porous self-supporting film, a solid electrolyte layer, and a first binder. The solid electrolyte layer is provided on one main surface of the porous self-supporting film. The first binder contains a polymeric material. The porous self-supported film and the solid electrolyte layer are adhered with the first binder. The first binder exists on another main surface of the porous self-supporting film. The solid electrolyte layer includes solid electrolyte particles and a second binder. The solid electrolyte particles have alkali metal ions conductivity. The second binder contains a polymeric material. The polymeric material of the second binder is a same material as the polymeric material of the first material. When a separator having such a configuration is used, the movement of water between the positive electrode and the negative electrode can be suppressed, and, at the same time, the thickness of the separator can be reduced. Accordingly, the secondary battery according to the at least one embodiment including such a separator can implement high energy density and high life characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A separator comprising:
    a porous self-supporting film;
    a solid electrolyte layer provided on one main surface of the porous self-supporting film; and
    a first binder which comprises a first polymeric material and exists on both of the one main surface and another main surface of the porous self-supporting film,
    wherein the porous self-supporting film and the solid electrolyte layer are adhered with the first binder,
    the solid electrolyte layer comprises a second binder and solid electrolyte particles, and
    the second binder comprises a second polymeric material which is the same as the first polymeric material of the first binder.

2. The separator according to claim 1, wherein the porous self-supporting film is a porous resin sheet or a nonwoven fabric.

3. The separator according to claim 1, wherein the polymeric material comprises a polymer comprising a monomer unit which is a hydrocarbon with a functional group comprising at least one element selected from the group consisting of oxygen, sulfur, nitrogen, and fluorine, and a ratio of the polymer in the polymeric material comprising the monomer unit is 70 mol % or more.

4. The separator according to claim 1, wherein the solid electrolyte particles comprise at least one of a NASICON type $Li_{1+x}Al_xTi_{2-x}(PO_4)_3$ (0.1≤x≤0.5) and a garnet type $Li_7La_3Zr_2O_{12}$.

5. The separator according to claim 1, wherein water absorption of the polymeric material is from 0.1% to 10%.

6. The separator according to claim 3, wherein the polymeric material comprises a polymer made of the monomer unit, and the polymer comprises at least one material selected from the group consisting of polyvinyl formal, polyvinyl alcohol, polyvinyl butyral, polymethyl methacrylate, and polyvinylidene fluoride.

7. The separator according to claim 1, wherein a ratio of the second binder in the solid electrolyte layer is from 1 mass % to 20 mass %.

8. The separator according to claim 1, wherein the solid electrolyte particles have alkali metal ion conductivity.

9. An electrode group comprising:
    a positive electrode comprising a positive electrode active material;
    a negative electrode comprising a negative electrode active material; and
    the separator according to claim 1 which is located at least between the positive electrode and the negative electrode.

10. The electrode group according to claim 9, wherein the solid electrolyte layer is located between the porous self-supporting film and the negative electrode.

11. The electrode group according to claim 9, wherein the negative electrode active material comprises a compound whose lithium ion insertion/extraction potential is 1 V (vs. Li/Li$^+$) to 3 V (vs. Li/Li$^+$) with respect to a potential based on metal lithium.

12. The electrode group according to claim 9, wherein the positive electrode active material comprises a compound whose lithium ion insertion/extraction potential is 2.5 V (vs. Li/Li$^+$) to 5.5 V (vs. Li/Li$^+$) with respect to a potential based on metal lithium.

13. A secondary battery comprising:
    the electrode group according to claim 9; and
    an aqueous electrolyte.

14. A battery pack comprising the secondary battery according to claim 13.

15. The battery pack according to claim 14, further comprising:
    an external power distribution terminal; and
    a protective circuit.

16. The battery pack according to claim 14, which comprises plural of the secondary battery, wherein the plural of the secondary battery are electrically connected in series, in parallel, or in combination of series and parallel.

17. A vehicle comprising the battery pack according to claim 14.

18. The vehicle according to claim 17, which comprises a mechanism configured to convert kinetic energy of the vehicle into regenerative energy.

19. A stationary power supply comprising the battery pack according to claim 14.

20. The separator according to claim 1, wherein the first binder is same as the second binder.

* * * * *